US012084894B2

(12) United States Patent
Mollick

(10) Patent No.: US 12,084,894 B2
(45) Date of Patent: Sep. 10, 2024

(54) PADLOCK SHACKLE PROTECTIVE SLEEVE

(71) Applicant: Peter Joseph Mollick, Phoenix, AZ (US)

(72) Inventor: Peter Joseph Mollick, Phoenix, AZ (US)

( * ) Notice: Subject to any disclaimer, the term of this patent is extended or adjusted under 35 U.S.C. 154(b) by 349 days.

(21) Appl. No.: 17/344,868

(22) Filed: Jun. 10, 2021

(65) Prior Publication Data

US 2022/0356736 A1 Nov. 10, 2022

Related U.S. Application Data

(60) Provisional application No. 63/186,722, filed on May 10, 2021.

(51) Int. Cl.
*E05B 67/38* (2006.01)
*E05B 67/06* (2006.01)
*E05B 67/22* (2006.01)

(52) U.S. Cl.
CPC .............. *E05B 67/38* (2013.01); *E05B 67/06* (2013.01); *E05B 67/22* (2013.01); *E05B 2067/066* (2013.01); *E05B 67/383* (2013.01)

(58) Field of Classification Search
CPC .......... E05B 67/04; E05B 67/06; E05B 67/22; E05B 67/38; E05B 67/383; E05B 2067/066
See application file for complete search history.

(56) References Cited

U.S. PATENT DOCUMENTS 2,375,488 A * 5/1945 Olson .................. E05B 17/002 70/38 A
2,904,985 A * 9/1959 Murphy ................ E05B 17/002 70/455
3,908,415 A * 9/1975 Foote ...................... E05B 67/06 70/53
4,218,902 A 8/1980 Druschel
4,224,813 A * 9/1980 Hampton ................ E05B 67/02 70/53
4,308,730 A * 1/1982 Roth ................. H01R 13/6397 70/53

(Continued)

*Primary Examiner* — Christopher J Boswell

(57) ABSTRACT

The disclosed invention relates to a padlock comprising a U-shaped-shackle. The invention discloses a sleeve that fits tightly, mostly covering or surrounding a portion of the straight portion of the shackle-toe and wherein the sleeve also fits loosely and mostly covering or surrounding a small portion of the U-shaped-shackle-head nearest the shackle-toe. The sleeve being designed to deter a jawed manual bolt-cutting tool from cutting apart the shackle-toe of a padlock that comprises a U-shaped shackle. The sleeve also being designed large enough to be prevented from being pulled through the hole, staple, or link the padlock shackle is secured therein, therefore, mandating the shackle-toe remains in the hole, staple, or link the shackle-toe is secured therein. After cutting the shackle-heel or the shackle-head apart and wherein a portion of the U-shaped shackle-head remains attached to the shackle-toe, the disclosed invention sleeve will remain secured in place on the shackle-toe as any curved portion of the shackle-head will not allow the sleeve to slide off of its position on the shackle-toe, therefore, the padlock remains locked and secured in place.

21 Claims, 19 Drawing Sheets

(56) References Cited

U.S. PATENT DOCUMENTS

| | | | | |
|---|---|---|---|---|
| 4,901,543 | A | 2/1990 | Applebaum | |
| 5,216,903 | A * | 6/1993 | Chen | E05B 67/38 70/417 |
| 7,412,856 | B1 | 8/2008 | Gogel | |
| 8,863,562 | B1 * | 10/2014 | Leving | E05B 67/38 70/53 |
| 2004/0093914 | A1 * | 5/2004 | Vito | E05B 67/06 70/56 |
| 2023/0110118 | A1 * | 4/2023 | Lee | E05B 67/38 70/43 |

* cited by examiner

PADLOCK SHACKLE PROTECTIVE SLEEVE

CROSS-REFERENCE TO RELATED APPLICATIONS

This application claims the benefit of U.S. Provisional Patent Application No. 63/186,722 titled "PADLOCK SHACKLE PROTECTIVE SLEEVE" filed May 10, 2021, the contents of which are incorporated herein by reference in their entirety.

BACKGROUND OF THE INVENTION

A padlock can be defined as "a removable lock with a shackle that can be passed through a staple or link and then secured". Various types of padlocks with various shackle designs are currently used around the world for many different uses, such as securing an object in place, or for the prevention of access into or through a device such as a toolbox or a gate. Two main components of a padlock are the body and the shackle. The shackle usually being a there-through device that protrudes through an external device such as a hole, staple, or link and then the shackle locks and secures into the body of the padlock. One of the most popular padlock versions sold in the marketplace today is the padlock with a U-shaped-shackle that comprises two posts at one end of the shackle, wherein each post fits into the body of the padlock, the other end of the shackle is a U-Shaped bend of the shackle called the shackle-head. The two posts are called a shackle-toe and a shackle-heel. The shackle-toe releases from the body of the padlock when the padlock is in the unlocked and open position of the padlock, the shackle-heel remains attached to the body of the padlock in the locked or unlocked position of the padlock. There is more than one reason the U-shaped-shackle is popular with padlock users when the U-shaped-shackle style is compared to other padlock shackle styles such as an armored shackle padlock, a straight shackle padlock, a partially hidden shackle padlock, or a shutter-style padlock that is sometimes called a rectangular padlock.

The U-shaped-shackle version of a padlock design even with all its advantages comprises a disadvantage resulting from the large exposure length of the shackle. The shackle is exposed along two side posts (shackle-toe and shackle-heel) and at the U-Shaped end portion of the shackle (shackle-head), cutting the shackle apart at any portion of the shackle usually allows removal of the padlock from the object the padlock is securing. The U-shaped style of the shackle usually allows the easy removal of the shackle form a secured object because the smooth U-shape of the shackle allows easy movement through a hole, staple or link. The diameter of the U-shaped-shackle is normally consistent throughout the entire length of the shackle. Cutting a padlock shackle apart wherein the shackle is weak enough to be cut by a manual bolt-cutter tool is usually an easy, quick, and relatively silent procedure. The U-shaped-shackle version of a padlock design usually is not normally used for locking a trailer tongue latching mechanism to a vehicle towing hitch ball hitch because of the ease of cutting the shackle apart with a manual bolt-cutter tool that will allow the removal of the shackle from the trailer tongue latching mechanism and then allow the separation of the trailer from the tow vehicle. The shackle being exposed along two sides and at the U-Shaped end portion of the shackle allows the U-shaped-shackle padlock to be easily cut and removed from a trailer tongue latching mechanism.

A more secure version of a U-shaped-shackle padlock is an armored shackle padlock that comprises armor attached to the shackle along one side and around the end of the shackle leaving one side of the shackle available to lock into a trailer tongue latching mechanism. One example of a padlock of this type is a Master Lock brand "Armored Trailer Lock with Shackle Guard". This more secure version of the shackle is limited in choices of shackle sizes and lengths by the manufacturer.

The straight shackle version of a padlock design comprises two ends of the shackle and wherein only one end of the shackle fits into the body of the padlock and the other end of the shackle comprises a stop-device. The straight shackle version of the padlock is popular to lock trailer tongue latching mechanism to a vehicles towing ball hitch to prevent the unauthorized removal of the trailer from the towing vehicle. When the straight shackle padlock is installed on a trailer tongue latching mechanism, the straight shackle version makes it difficult if not impossible to fit the jaws of a bolt cutter tool around the shackle to cut the shackle apart, therefore preventing a thief from separating the trailer from the tow vehicle. The straight shackle type of padlock can also be described as a pin and barrel padlock. One disadvantage to the straight shackle padlock is that when the padlock is in the unlocked position and removed from a secured object, the shackle is separated from the padlock body of the padlock resulting in two separate pieces of the padlock to keep possession of.

Another style of a padlock called a partially-hidden shackle padlock is also popular for the use to lock a trailer tongue latching mechanism to a vehicles towing ball hitch, this lock shackle design is also a U-shaped-shackle design with added protection next to a substantial portion of the shackle, the added protection is attached to the body of the padlock and not attached to the shackle of the lock. The added protection acts as an obstruction to the jaws of a bolt-cutter tool. When the partially hidden shackle padlock is installed on a trailer tongue latching mechanism, the partially hidden shackle version makes it difficult if not impossible to fit the jaws of a bolt-cutter tool around the shackle to cut the shackle apart, therefore preventing a thief from separating the trailer from the tow vehicle.

The jaws of a jawed manual bolt cutter tool are approximately ½ of an inch thick while tapering down to the very slim and sharp cutting edges of the jaws, leaving approximately ¼ of an inch of a space from the outside of either side of the jaw to the center of the cutting edges of the jaws. The length of taper on each jaw from the full thickness of the jaw to the tapered cutting edge is approximately ⅜ of an inch.

And yet another style of a padlock called a shutter-style padlock or rectangular padlock is also popular for the use to lock a trailer tongue latching mechanism to a vehicles towing ball hitch. The shutter-style padlock design employs a straight shackle and a three-sided body of the padlock allowing the padlock shackle to be protected form the jaws of a manual bolt-cutter tool when the padlock is attached to a trailer tongue latching mechanism. The added protection around a substantial portion of the shackle, the added protection is attached to the body of the padlock and not attached to the shackle of the padlock. The added protection acts as an obstruction to the jaws of a bolt-cutter tool. When the shutter-style padlock is installed on a trailer tongue latching mechanism, the shutter-style padlock makes it difficult if not impossible to fit the jaws of a bolt-cutter tool around the shackle to cut the shackle apart, therefore preventing a thief from separating the trailer from the tow vehicle.

The armored shackle padlock, straight shackle padlock, partially-hidden shackle padlock, and the shutter-style padlock are designed for a higher grade of security than the U-shaped-shackle padlock, although the armored shackle padlock, straight shackle padlock, partially-hidden shackle padlock, and the shutter-style padlock are usually more expensive and limited in design choices such as shackle length, shackle spread, shackle diameter, and key choices.

The padlock with a U-shaped-shackle is very versatile and is used in many different applications from gate latch locks to chain locking. Some advantages of the U-shaped-shackle padlock are:

The U-shaped-shackle can be used to connect two pieces of chain, attach a chain to a secured device, or lock in place a gate latch while the padlock body hangs down and out of the way of other parts of the gate latch that a pin and barrel padlock positioning may interfere with. The great linear length of the U-shaped-shackle allows for some uses of the padlock that the armored shackle padlock, straight shackle padlock, partially-hidden shackle padlock, and the shutter-style padlock are not able to accommodate such as properly connecting multiple chains together without overcrowding the shackle.

An important advantage the U-shaped-shackle padlock has over a pin and barrel padlock is that the shackle is pivotally and permanently attached to the padlock body and cannot be fully separated from the padlock body. The pin and barrel padlock with the straight shackle separates into two pieces when unlocked and pulled apart. The pin and barrel padlock user then needs to keep track of both pieces of the padlock making sure each piece is not lost separated from the other or mixed up with other sized pin and barrel padlocks.

The versatility and popularity of the U-shaped-shackle padlock also allows for a great selection of shackle diameters, shackle spreads, shackle length sizes and shackle security grades of hardness from low to high that the armored shackle padlock, straight shackle padlock, partially-hidden shackle padlock, and the shutter-style padlocks may not offer.

Generally, in the application of a trailer tongue latching mechanism attaching to a vehicle towing ball hitch, certain locks are the preferred choices of use in the marketplace. The preferred locks are: the armored shackle padlock, the straight shackle padlock, the partially-hidden shackle padlock, and the shutter-style padlock. Some advantages of the armored shackle padlock, straight shackle padlock, partially-hidden shackle padlock, and the shutter-style padlock are:

They can be designed to fit semi-tightly across a standard sized trailer tongue latching mechanism, or they can be designed to fit across a tow vehicle's receiver hitch that receives and coupler that attaches to a trailer for towing the trailer. The semi-tightly fit deters the padlock shackle from being cut by the jaws of a bolt-cutter tool.

A straight shackle pin and barrel padlock for use on a trailer tongue latching mechanism application usually has a locked shackle length of approximately ¾ of an inch to allow the padlock body and the stop-device to fit semi-tightly against the trailer tongue latching mechanism allowing approximately ⅛ of an inch clearance on each side of the trailer tongue latching mechanism.

A straight shackle pin and barrel padlock for use on a trailer coupler receiver and coupler application usually has a locked shackle length of approximately 2½ inches to allow the padlock body and the stop-device to fit semi-tightly against the receiver allowing approximately ⅛ of an inch clearance on each side of the receiver.

To further describe a trailer tongue latching mechanism, the hole in a trailer tongue latching mechanism typically has a diameter of slightly over ⅜ of an inch for the entry of a ⅜ of an inch or less diameter padlock shackle to securely lock the latch in the latched position. The hole diameter size usually being limited to approximately ⅜ of an inch may be due to a lack of available space in the latching mechanism. The hole diameter allows the end user of the trailer tongue latching mechanism to use a padlock with a ⅜ inch or less diameter shackle to securely lock the latch and prevent unauthorized unlatching of the latch. If there is too much space between the padlock body and the trailer tongue latching mechanism or too much space between the stop-device and the trailer tongue latching mechanism of a straight shackle padlock, the jaws of a bolt-cutter tool will fit around the padlock shackle allowing the cutting of the padlock shackle, therefore allowing the removal of the padlock shackle from the trailer tongue latching mechanism allowing an unauthorized unlatching of the latch. A large manual bolt-cutting tool can cut through a non-protected ⅜" or less diameter padlock shackle for removal of the padlock shackle from the trailer tongue latching mechanism even if the padlock shackle is comprised of hardened steel, this is the reason the straight shackle padlock is designed with the padlock body and the stop-device fitting semi-tight against the trailer tongue latching mechanism to prevent the jaws of a bolt-cutter tool access to the straight shackle of the padlock.

There are other methods of cutting a padlock shackle other than a jawed manual bolt-cutting tool, one such device is a battery operated grinding tool with a thin cut-off style blade that can enter into and cut in a minimal clearance of space like between a stop-device and a trailer tongue latching mechanism. Although, using a grinding tool and a cut-off blade makes a substantial amount of noise for at least ten to twenty seconds during the cut that would normally alert a nearby person or a security guard in the area even if that person or the security guard is sleeping at the time. Therefore, the tool of choice for cutting a padlock shackle from a trailer tongue latching mechanism by a prospective vandal or thief is generally a jawed manual bolt-cutting tool, usually requiring only a one to two second cut duration with very little noise.

The straight shackle padlock design with a stop-device on one end comprises the stop-device being a larger diameter than the shackle portion that protrudes through a hole, staple, or link and that fits into the body of the padlock. A larger diameter of the stop-device can be machined into the shackle by machining down the areas of the shackle that are not comprised of the stop-device, or the stop-device can be separate device attached to a continuous identical conforming diameter padlock shackle. The stop-device may be a separate device attached to the padlock shackle with a process such as metal welding or a glued epoxy attachment, or the stop-device may be machined and shaped into the padlock shackle created by a reduction of the shackle diameter that fits through a hole and into locks the padlock body. With the padlock shackle locked in place in a trailer tongue latching mechanism, the stop-device restricts movement of the shackle through the hole that the smaller diameter shackle may fit into. The stop-device normally is a larger diameter that is difficult to remove or cut apart, preventing the padlock shackle from being removed from the hole, staple, or link the padlock shackle is secured therein to secure an object. Typically, the stop-device prevents the smaller diameter shackle from being accessible to a manual bolt-cutting tool that comprises jaws that can cut through the smaller diameter area of the shackle.

Typically, a trailer tongue latching mechanism hole, staple, or link encompasses surrounding areas of the trailer tongue latching mechanism that prevent the bolt-cutting tool jaws from effectively partially surrounding the padlock shackle to proceed with cutting the padlock shackle there through, therefore, creating a situation wherein a jawed manual bolt cutting tool cannot gain an effective position to cut the shackle and remove the padlock shackle from the trailer tongue latching mechanism when the padlock shackle comprises a stop-device on one end of the shackle and the padlock body is on the other end of the shackle, and there are minimal clearances on each side of the trailer tongue latching mechanism between the body of the padlock and between the shackle stop-device, such as in the case of a straight shackle padlock locked onto a trailer tongue latching mechanism.

Another use for a straight shackle padlock that is similar to the use of a straight shackle padlock on securing a trailer tongue latching mechanism is installing a padlock on a tool called a ratchet binder, although at present, ratchet binders with attached locks are not nearly as popular as trailer tongue latching mechanism locks or tow vehicle receiver and coupler locks. The ratchet binder tool is used for securing loads on truck and trailer beds for secure non-shifting transportation of the load. Installing a padlock on a ratchet binder is not a new application of a padlock as there are multiple patent applications filed or granted claiming the use of a padlock to lock a ratchet binder in place to keep the ratchet binder from being removed from a bound load by an unauthorized person. Installing a padlock on a ratchet binder in most cases prevents the loosening of the ratchet binder, therefore preventing the loosening of the bind on the load when the load needs to stay secured. One granted patent is U.S. Pat. No. 6,945,516 B1 Scott, another granted patent is U.S. Pat. No. 9,453,557 B2 Chou. In addition to these granted patent applications, pending applications PCT/US20/00042 Mollick and U.S. Ser. No. 17/083,811 Mollick have been filed. Ratchet binder housings wherein a padlock can install on the housing is usually a wider span than a typical trailer tongue latching mechanism of ¾ of an inch or less of a span, and the ratchet binder housing span is usually narrower than a typical receiver and trailer coupler installation of 2½ inches or less of a span.

A keyed alike option of a group of locks can be very convenient for an end user that has a large number of locks used for the same purpose on different objects and wherein one key configuration for all of the locks is more convenient to use. One situation for the keyed alike option being convenient would be a truck driver that uses multiple lockable ratchet binders to bind the loads on the truck deck and one key for all of the ratchet binders is more convenient than carrying ten different keys and trying to match each key to a particular padlock.

A ratchet binder lockable span for the use of a U-shaped-shackle padlock or a pin and barrel padlock is in the approximate range of 1½ inches. Finding a pin and barrel padlock with a locked shackle spread of approximately 1½ inches may be a challenge in the marketplace since the ratchet binder locks have not attained significant popularity, although the popularity may change in the future. Using a U-shaped-shackle padlock on a ratchet binder housing is an easy application since the U-shaped-shackle locks are available in many different sizes of diameter of the shackle and many different length sizes of the shackles, although the U-shaped-shackle locks do not afford the degree of security the pin and barrel locks provide in resisting the cutting of the shackle using a jawed manual bolt cutting tool.

Some of the components of a U-shaped-shackle padlock are the shackle toe, the shackle heel, and the shackle head. The shackle toe is the portion of the shackle that releases from the body of the padlock in the unlocked position of the padlock. The shackle heel is the portion of the shackle that always is connected to the body of the padlock and sometimes is pushed by a spring to assist the shackle in moving to the open position of the padlock. The shackle-head is the U-shaped bend of the shackle.

SUMMARY OF THE INVENTION

The disclosed invention relates to a padlock comprising a U-shaped-shackle. The U-shaped-shackle comprises a U-shaped-shackle-head, a straight shackle-toe and a straight shackle-heel. The invention discloses a sleeve that fits tightly, mostly covering or surrounding a portion of the shackle-toe and wherein the sleeve fits loosely and mostly covering or surrounding a small portion of the U-shaped-shackle-head nearest the shackle-toe. The sleeve may be a sleeve that completely surrounds the shackle-toe or the sleeve may stop short of surrounding the shackle-toe and have a small linear portion of the sleeve open such as a lineal open slice in the sleeve. A sleeve with a lineal open slice may be an advantage over the surrounding sleeve as the sleeve with the lineal open slice may be somewhat flexible in the inside diameter (ID) of the sleeve and allow for a tighter fit around the shackle-toe with a minimum or no clearance between the inside diameter (ID) of the sleeve and the outside diameter (OD) of the shackle-toe. Although the sleeve without a lineal open slice in the sleeve may have attributes the sleeve with the open lineal slice may be deficient in, such as greater cut resistance strength. In addition, the tightly fitting surrounding sleeve may be better suited for a permanent attachment to the shackle-toe such as a pressed on sleeve that is pressed on with a substantial force such as pounded by hand on or pressed on with a hydraulic force. The sleeve can be comprised of mostly or fully of metal or a metal alloy. The sleeve can be set up for a permanent attachment to the shackle-toe or a removable attachment to the shackle-toe.

The sleeve helps protect a portion of the shackle-toe from being cut apart using a jawed manual bolt-cutter tool. When the sleeve is properly sized, fitted, and attached to a U-Shaped padlock shackle, and the un-protected portion of the shackle-toe is passed through a hole, staple, or link, the sleeve prevents the ability of the shackle-toe to be cut apart using a jawed manual bolt-cutter tool, resulting in the shackle-toe maintaining its locked in place position even if the shackle heel or the U-shaped-shackle-head is cut apart, therefore maintaining the secured locking ability of the padlock body and shackle-toe combination.

At least one portion of the outside diameter (OD) of the sleeve should be sized sufficiently large enough to prevent the sleeve from being passed through the hole, staple, or link that the shackle toe is passed through. When the padlock shackle-toe is passed through a hole, staple, or link, and at least one portion of the outside diameter (OD) of the sleeve is sufficiently large enough to prevent the sleeve from being passed through the hole, staple, or link that the shackle-toe is passed through. If the sleeve prevents the shackle from being cut apart on the shackle toe and wherein the entirety of the shackle toe is straight, the shackle must be cut apart at the U-shaped-shackle-head or at the shackle heel, therefore the sleeve will not be able to be removed from the shackle toe for the reason that any portion of the U-shaped-shackle head will not pass through the sleeve to allow the sleeve to be slid off of the shackle-toe while the sleeve maintains a tight fit around the straight shackle toe, and wherein the sleeve is not removable from the shackle toe, the shackle toe will not be able to be removed from the hole, staple, or link that the shackle toe is passed through, therefore maintaining the secure locked position of the item such as a trailer coupler latch mechanism or a ratchet binder housing.

The sleeve has the advantage of being able to be manufactured in many various sizes and shapes to fit almost any size and shape of a U-shaped-shackle on the very popular U-shaped-shackle locks. The size and shape flexibility of a sleeve fitting on almost any size U-shaped-shackle padlock is an improvement over the limited sizes and variations of the locks such as the armored shackle padlock, the straight shackle padlock, the partially hidden shackle padlock, or the shutter-style padlock. In addition, the affordability of the sleeve when compared to one of the above stated high security padlock styles is also an improved factor to consider. The end user of a U-shaped-shackle padlock can simply install the correct sized sleeve for the U-shaped-shackle padlock to be used in a lockable application, sizing the diameter and length of the sleeve to the lockable application.

The sleeve when attached and sized correctly, allows the use of most any sized U-shaped-shackle padlock to be instantly converted to a U-shaped-shackle padlock with armor for use in certain specialized and popular uses of other types of armored padlocks. The sleeve creates not only a more affordable armored padlock, but also creates a great amount of flexible size range options that other armored padlocks such as the armored shackle padlock, straight shackle padlock, a partially-hidden shackle padlock, or a shutter-style or rectangular padlock do not offer or do not offer without being custom made at a substantial price increase from a standard size shackle size.

The sleeve comprises a sleeve-trunk, a sleeve-first-end, and a sleeve-second-end. When the sleeve is installed on the shackle-toe of a padlock shackle, the sleeve-first-end and the sleeve trunk is abutting to the U-Shaped bend of the shackle-head, the sleeve-second-end is the end closest to the padlock body, and the sleeve-trunk is the area of the sleeve between the sleeve-first-end and the sleeve-second-end. The sleeve-trunk fits tightly around the shackle-toe. The sleeve-first-end inside diameter (ID) is enlarged compared to the sleeve-trunk inside diameter (ID) and the sleeve-first-end fits loosely, mostly covering or surrounding a small portion of the U-shaped-shackle-head nearest the shackle-toe, the sleeve-first-end near the sleeve-trunk abutting the shackle-head, the sleeve-second-end being the portion of the sleeve closes to the padlock body. The sleeve-first-end is positioned and butted against the U-Shaped bend of the shackle and the sleeve-second-end is positioned very close to and preferable within approximately ⅛ inch of the hole, staple, or link the shackle-toe is passed through when the padlock is applied to secure a device and wherein the shackle of the padlock is in the closed and locked position. If the sleeve-second-end is forcefully abutted directly against the hole, staple, or link the shackle-toe is passed through when the padlock is in the locked position, the padlock may be difficult to be placed in the locked position from the unlocked position, therefore there should be a small amount of space between the sleeve-second-end and the hole, staple, or link the shackle-toe is passed through. Wherein the sleeve is attached to the padlock shackle, the only portion of the shackle available to pass though a hole, staple, or link is the portion of the shackle-toe between the sleeve-second-end and the tip of the shackle-toe, this length of the shackle-toe is called the shackle-toe-insert-area.

The sleeve-first-end may comprise approximately ⅛ to ¼ of an inch in length to form an enlargement of the sleeve-first-end inside diameter (ID) when compared to the sleeve-trunk inside diameter (ID). The sleeve can be permanently attached to the shackle, of the sleeve can be removably attached to the shackle. A permanent attachment of the sleeve may be accomplished by using metal welding or by using non-removable adhesive. A removable attachment of the sleeve may be accomplished by simply sliding the sleeve over the shackle-toe using a tight fitting sleeve or by using removable adhesive such as adhesive that can be removed with heat from a tool such as a torch. Three different versions of the same invention that serve the same functions of the invention are disclosed in this application:

a) a first version of the sleeve;
   i) wherein the sleeve comprises an enlargement of the inside diameter (ID) of the sleeve-first-end when compared to the sleeve-trunk inside diameter (ID) without enlarging the outside diameter (OD) of the sleeve-first-end. Enlarging the inside diameter (ID) of the sleeve-first-end when compared to the sleeve-trunk inside diameter (ID) without enlarging the outside diameter (OD) of the sleeve-first-end may require the removal of material from the inside of the sleeve-first-end using a process such as drilling out material from the sleeve-first-end while still leaving the wall thickness of the sleeve-first-end thick enough to provide enough strength in the sleeve to prevent the sleeve and the shackle-toe from being cut apart by a jawed manual bolt-cutter tool. The first version of the sleeve is acceptable if the sleeve-first-end, the sleeve-second-end, or the sleeve-trunk is larger than the inside diameter (ID) of the hole, staple, or link the shackle is to be passed through. The sleeve preventing a jawed manual bolt cutter tool from positioning the cutting edges of the jaws on the straight portion of the shackle being the shackle toe near the sleeve first-end, therefore, inhibiting or preventing the jaws of the jawed manual bolt cutter tool from cutting the shackle at the straight shackle-toe near the sleeve first-end.
b) a second version of the sleeve;
   wherein the sleeve comprises an enlargement of the inside diameter (ID) of the sleeve-first-end when compared to the sleeve-trunk inside diameter (ID) and wherein the sleeve comprises the enlargement of the outside diameter (OD) of the sleeve-first-end when compared to the trunk outside diameter (OD). Enlarging the inside diameter (ID) of the sleeve-first-end and also enlarging the outside diameter (OD) of the sleeve-first-end could be accomplished by expanding the sleeve-first-end at a depth of about ¼ of an inch inside the length of the sleeve, therefore affecting both the inside diameter (ID) and the outside diameter (OD) of the sleeve-first-end. The expansion of the sleeve-first-end may be accomplished easier by expanding the sleeve-first-end when the sleeve is in the malleable condition if the sleeve is comprised of mostly or fully of metal or a metal alloy, then re-hardening the sleeve to the proper hardness. The second version of the sleeve may result in a uniformly thicker and more durable sleeve-first-end when compared to the first version of the sleeve. The enlargement can be a linear parallel enlargement or a flared enlargement, although a flared enlargement may be preferred. The second version of the sleeve is acceptable if the sleeve-first-end, the sleeve-second-end, or the sleeve-trunk is larger than the inside diameter (ID) of the hole, staple, or link the shackle is to be passed through.

c) a third version of the sleeve:

i) wherein the sleeve comprises the inside diameter (ID) of the sleeve-first-end being non-enlarged when compared to the sleeve-trunk inside diameter (ID), the sleeve-first-end inside diameter (ID) is the same diameter as the sleeve-trunk inside diameter (ID) the sleeve first-end fits tightly around the shackle-toe, the sleeve first-end abutting the shackle-head. The sleeve-second-end being the portion of the sleeve closest to the padlock body and comprises a large outside diameter (OD) of the entire sleeve resulting in an extra thick sleeve wall when compared to the first, second, and fourth version of the sleeve. The third version of the sleeve requires the thickness of the sleeve wall to be approximately at least ¼ of an inch thick and preferably approximately ⅜ of an inch or ½ of an inch or greater in wall thickness. The third version of the sleeve is acceptable if the sleeve-first-end, the sleeve-second-end, or the sleeve-trunk is larger than the inside diameter (ID) of the hole, staple, or link the shackle is to be passed through. The sleeve first-end abutting the shackle-head, the sleeve-second-end being the portion of the sleeve closest to the padlock body, the sleeve wall thickness being of sufficient thickness such as ¼ of an inch to ½" of an inch of wall thickness to prevent a jawed manual bolt cutter tool from positioning the cutting edges of the jaws on the straight shackle-toe near the sleeve first-end, therefore, preventing the jaws of the jawed manual bolt cutter tool from cutting the shackle at the straight shackle-toe near the sleeve first-end.

ii) The purpose of the extra thick sleeve wall is to inhibit a jawed manual bolt cutter tool jaw cutting edges from positioning directly against the sleeve-first-end. The jaws of the jawed manual bolt cutter tool are approximately ½ of an inch thick while tapering down to the very slim and sharp cutting edges of the jaws, leaving approximately ¼ of an inch of a space from the outside of either side of the jaw to the center of the cutting edges of the jaws. The jaw taper length along the taper on each jaw from the full thickness of the jaw to the tapered cutting edge is approximately ⅜ of an inch. Wherein a sleeve wall thickness is ⅜ of an inch, the ¼ of an inch space from the outside edge of the jaws of the manual jawed bolt-cutter to the cutting edges would mean a cut on the shackle of the padlock using the jawed manual bolt cutter-tool would be spaced approximately ¼ of an inch away from the sleeve first end, therefore, positioning the cut on the shackle in the U-shaped-shackle-head, therefore, preventing the sleeve from being removed from the shackle-toe, as a portion of the U-shaped-shackle-head will still be attached to the shackle-toe, resulting in the padlock maintaining a locked position after the shackle has been cut ¼ of an inch away from the sleeve first end.

iii) The third version of the sleeve comprising the extra thick sleeve wall also adds protection from the jawed manual bolt cutter tool from accessing the shackle-toe between the sleeve-second-end and a trailer coupler latch mechanism.

iv) The third version of the sleeve is acceptable if the sleeve-first-end, the sleeve-second-end, or the sleeve-trunk is larger than the inside diameter (ID) of the hole, staple, or link the shackle is to be passed through.

d) a fourth version of the invention;

wherein the sleeve comprises a cutout of the sleeve-first-end, the cutout creating an appendage protruding from the sleeve-trunk. The appendage partially covering a portion of the U-shaped-shackle-head, the appendage inhibiting or deterring a jawed manual bolt cutting tool from cutting apart the shackle-head portion partially covered by the appendage and preventing the tool such as a jawed manual bolt-cutting tool from cutting the shackle on the straight shackle-toe nearest the sleeve first-end. The appendage covering an outside portion of the U-shaped-shackle-head nearest the shackle toe. The cutout allowing the sleeve-trunk to abut against the inside portion of the U-shaped-shackle-head nearest the shackle toe. The fourth version of the sleeve is acceptable if the sleeve-first-end, the sleeve-second-end, or the sleeve-trunk is larger than the inside diameter (ID) of the hole, staple, or link the shackle is to be passed through.

BRIEF DESCRIPTION OF THE DRAWING

FIG. 3 is the same padlock as FIG. 1 with the shackle in a locked position and FIG. 4 is the same padlock as FIG. 1 with the shackle in an unlocked position.

DETAILED DESCRIPTION OF THE INVENTION

Reference Numerals

Figure 1:
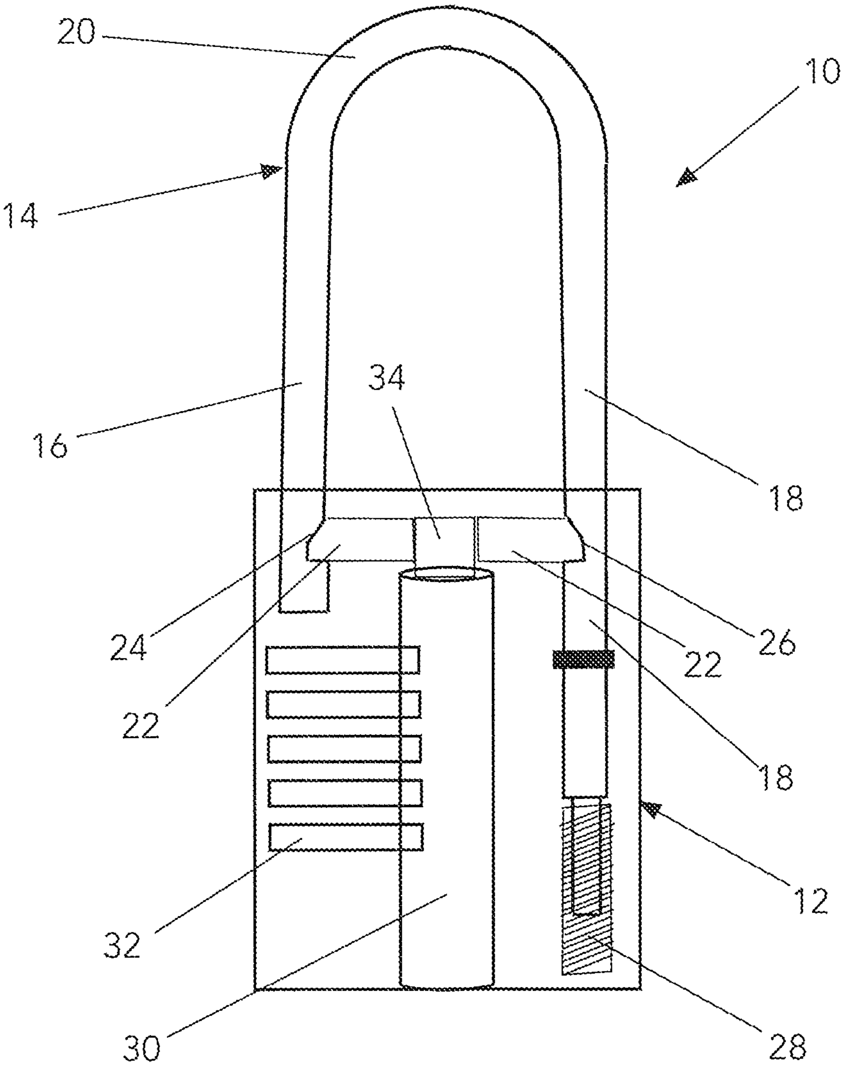
FIG. 1 Prior Art
FIG. 1 is a frontal view of a prior art padlock comprising a U-shaped-shackle. The drawing shows some of the internal working parts of the padlock body including the shackle.

For the convenience of the reader, the following is a list of reference numbers used in the detailed description and the drawings:

2 Sleeve
3 Sleeve inside diameter (ID)
4 Sleeve-trunk
5 Sleeve outside diameter (OD)
6 Sleeve-first-end
7 Sleeve appendage
8 Sleeve-second-end
9 Sleeve-lineal-open-slice
10 Padlock
11 Enlarged inside diameter (ID)
12 Body
13 Enlarged outsider diameter (OD)
14 U-shaped-shackle
15 Non-enlarged inside diameter
16 Shackle-toe
17 First shackle-toe cut area
18 Shackle-heel
19 Second shackle-toe cut area
20 Shackle-head
21 Shackle-head-coverage
22 Shackle-latch
23 Trunk inside diameter (ID)
24 Shackle-toe-notch
25 Trunk outside diameter (OD)
26 Shackle-heel-notch
27 Shackle-toe-insert-area
28 Shackle-spring
29 Shackle-sever cut
30 Plug body
31 Sleeve first-end angle
32 Key pin chamber
34 Plug body cam
35 Trailer tongue latching mechanism
36 Trailer tongue latch
37 Trailer tongue latch hole
38 Trailer coupler (connects the trailer tongue to the tow vehicle receiver)
39 Trailer tongue
40 Ratchet binder
41 Ratchet binder handle assembly
42 Jawed manual bolt cutter tool
43 Bolt cutter tool handle
44 Bolt cutter tool jaws
46 Jaw taper length
48 Jaw outside edge to cutting edge
49 Jaw thickness
50 jaw cutting edge
52 Jaw taper
54 Staple or link secured
56 Pin and barrel lock
58 Barrel
60 Pin Shackle
62 Stop device
64 Trailer coupler ball
66 Ratchet binder pawl FIG. 1 is a frontal view of a typical prior art padlock 10. The shackle 14 is a U-shaped-shackle 14 showing the shackle-head 20 forming the U-shape, the shackle-toe 16 and the shackle-heel 18. The padlock 10 body 12 encases various parts of the padlock including but not limited to, the end of the shackle-toe 16 that comprises the shackle-toe-notch 24, the end of the shackle-heel 18 that comprises the shackle-heel-notch 26, the shackle-latch 22, the plug body 30, the plug body cam 34 that is attached to the plug body 30, the key pin chambers 32 and a shackle-spring 28.

Figure 2:
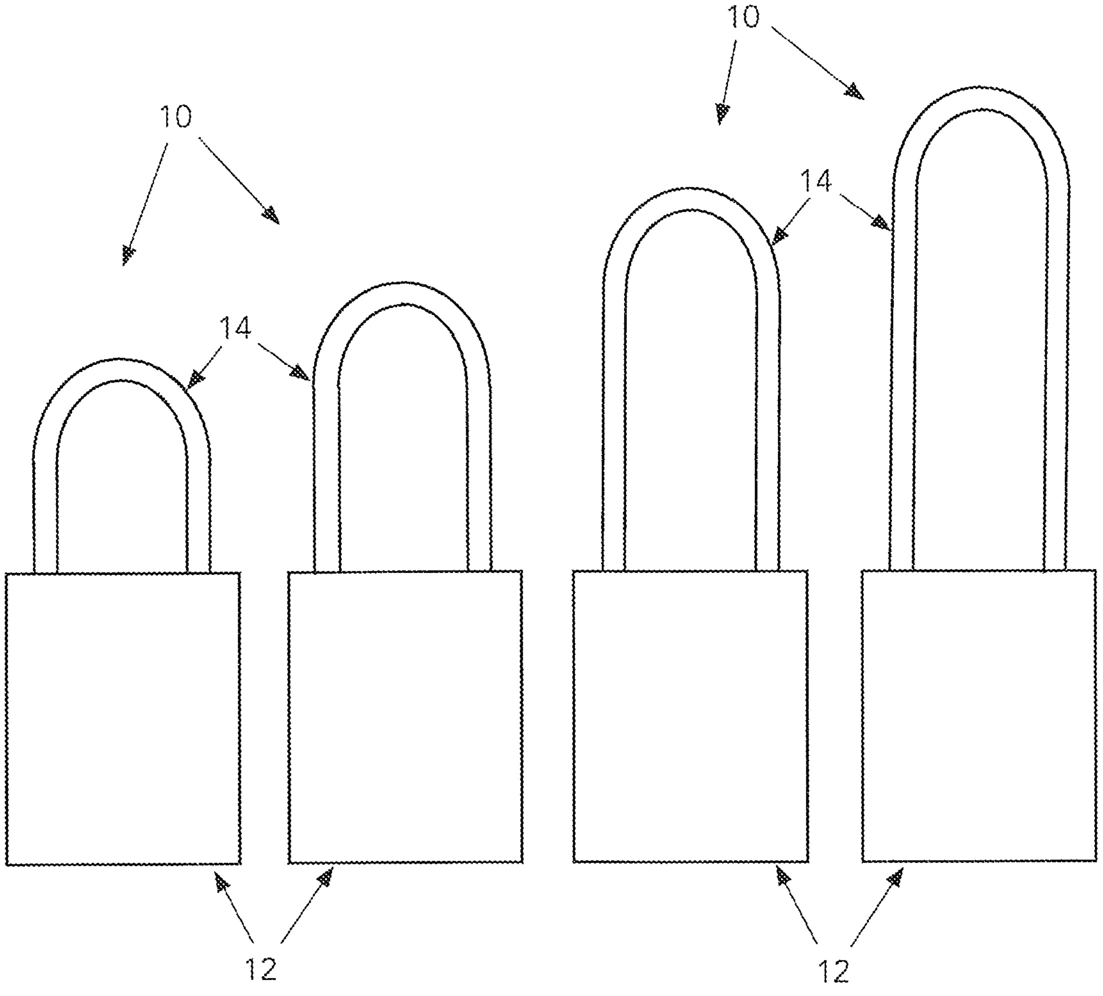
FIG. 2 Prior Art
FIG. 2 is a frontal view of four prior art padlocks with different sized shackles.

FIG. 2 shows a side view of four prior art padlocks 10 with various sized shackles 14. Each padlock 10 comprising the same sized padlock 10 body 12.

Figure 3:
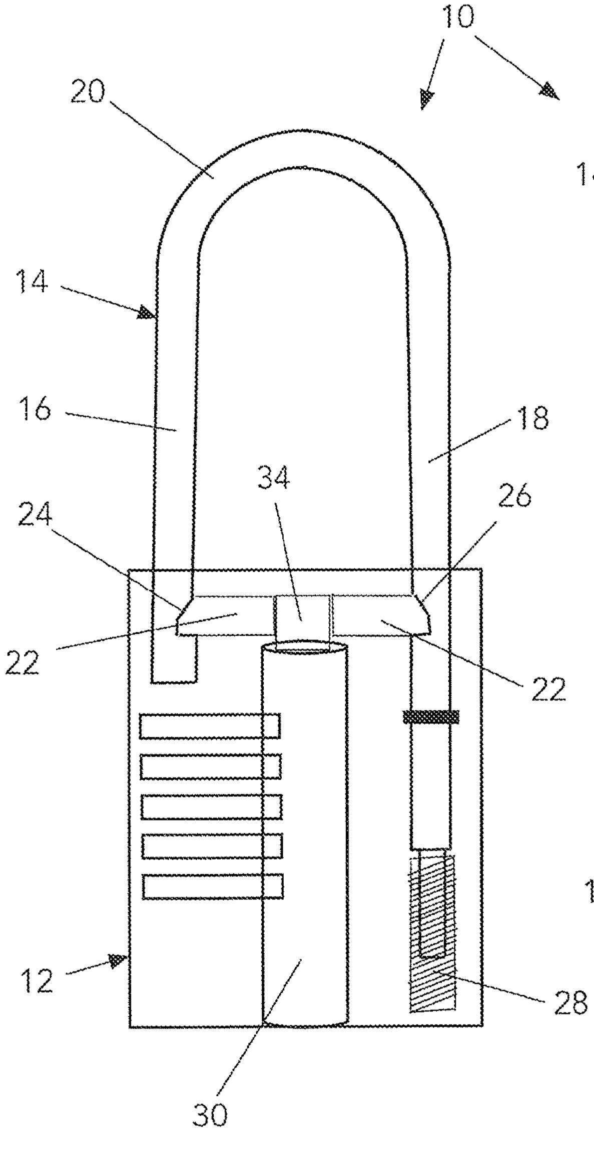
FIG. 3 Prior Art
FIG. 3 and FIG. 4 are frontal views of two prior art padlocks side by side.

FIG. 3 shows the same prior art padlock 10 in FIG. 1 in the locked position whereas the shackle-toe 16 is fully depressed on the padlock 10 body 12. The plug body 30 cam 34 is shown parallel to the padlock 10 body 12 width, therefore spreading the two shackle-latches 22 into the shackle-toe-notch 24 and the shackle-heel-notch 26 locking the shackle 14 in the depressed and locked position. The shackle spring 28 is shown compressed.

Figure 4:
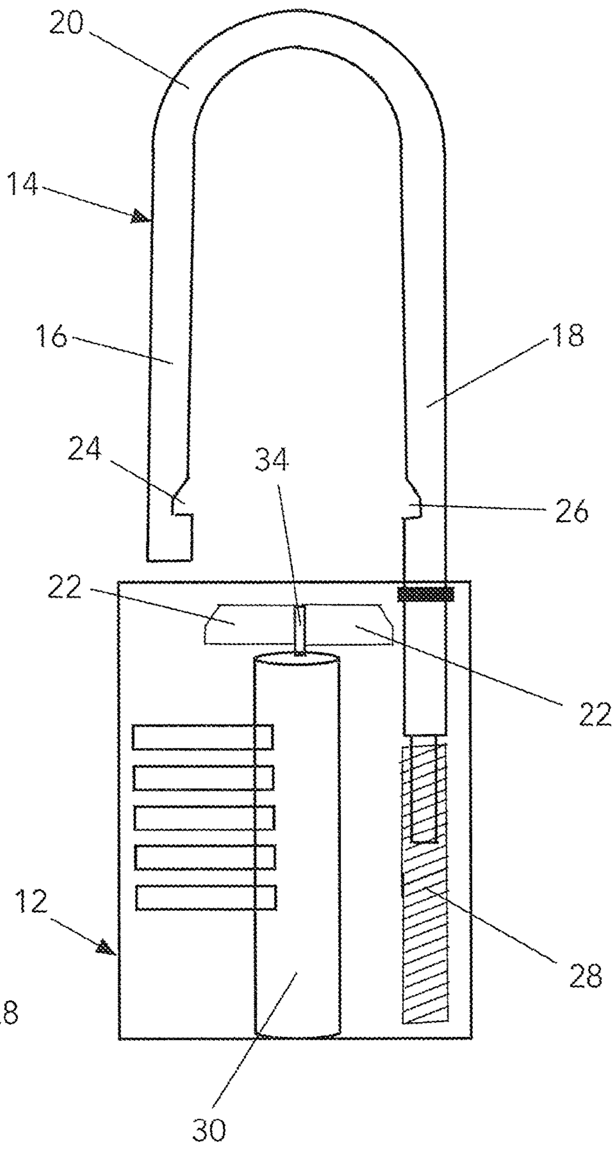
FIG. 4 Prior Art

FIG. 4 shows the same prior art padlock 10 in FIG. 1 in the unlocked position whereas the shackle-toe 16 is extended out of the padlock 10 body 12. The plug body cam 34 is show perpendicular to the padlock 10 body 12 width allowing the two shackle-latches 22 to release from the shackle-toe-notch and the shackle-heel-notch, unlocking the shackle, and allowing the shackle spring to extend the shackle upwards, moving the shackle-toe completely out of the padlock 10 body 12. The shackle spring 28 is expanded.

Figure 5A:
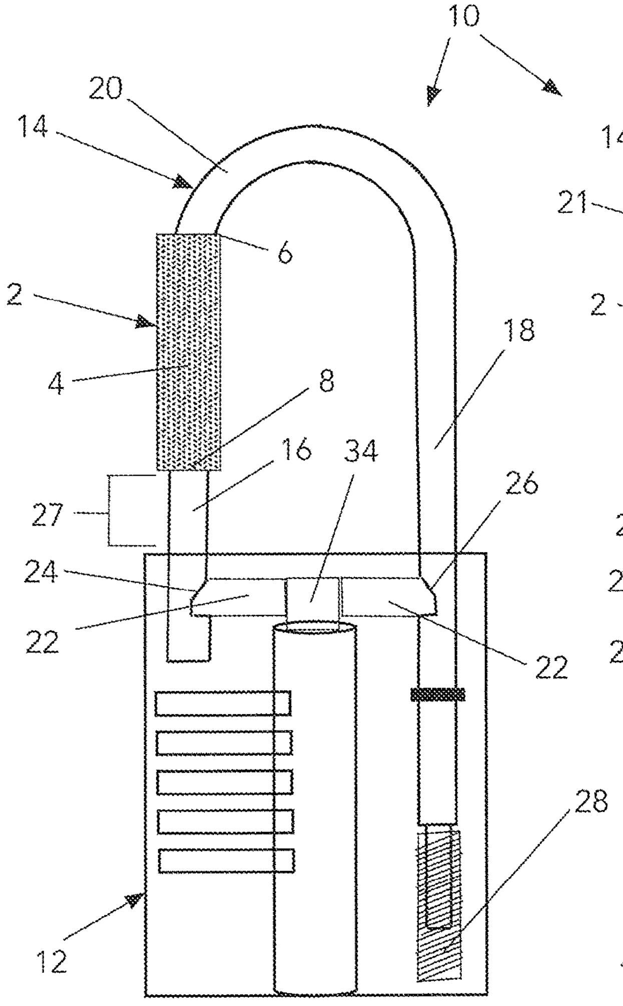
FIG. 5*a* shows the same padlocks as FIG. 3 with the addition of the disclosed invention installed on each shackle-toe. The first version of the disclosed invention is shown.

FIG. 5*a* shows the same prior art padlock 10 of FIG. 3 in the locked position comprising the disclosed invention sleeve 2 surrounding a portion of the shackle-toe 16. The sleeve 2 is the first version of the sleeve 2 wherein the sleeve-first-end 6 inside diameter (ID) 3 is enlarged when compared to the sleeve-trunk inside diameter (ID) 23 allowing the sleeve-first-end 6 to partially cover or surround a small portion of the U-shaped shackle-head 20, and the sleeve-first-end 6 outside diameter (OD) is not enlarged. The sleeve-second-end 8 outside diameter (OD) 5 is the same diameter as the sleeve-trunk 4. The sleeve-first-end 6 and sleeve-trunk 4 is abutted against the U-shaped shackle-head 20, therefore, allowing the sleeve-first-end 6 to partially cover or surround a portion of the U-shaped shackle-head 20. Since the sleeve-trunk 4 fits tightly around the shackle-toe 16, virtually any amount of bend of the U-shaped shackle-head 20 will prevent the sleeve 2 from slipping off of the shackle-toe 16 if the shackle head is cut apart outside of the area that the sleeve 2 is covering. The shackle-toe-insert-area 27 is shown positioned between the sleeve-second-end 8 and the body 12 of the padlock 10. The shackle-toe-insert-area 27 is the area of the shackle-toe that protrudes through an external device such as a hole, staple, or link such as a trailer tongue latch hole 37 (see FIG. 15). The shackle-spring 28 is shown compressed.

Figure 5B:
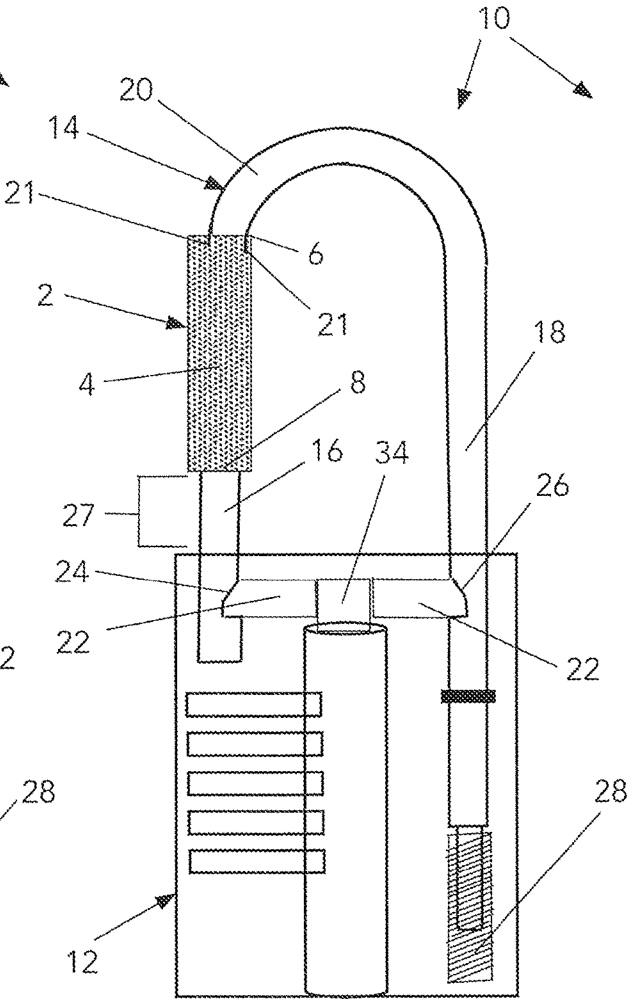
FIG. 5*b* shows the same padlocks as FIG. 5*a* while also showing the covered portion of the U-shaped shackle-head.

FIG. 5*b* shows the same padlocks as FIG. 5*a* while also showing the covered portion of the U-shaped shackle-head 20 referred to as the shackle-head-coverage 21.

Figure 6:
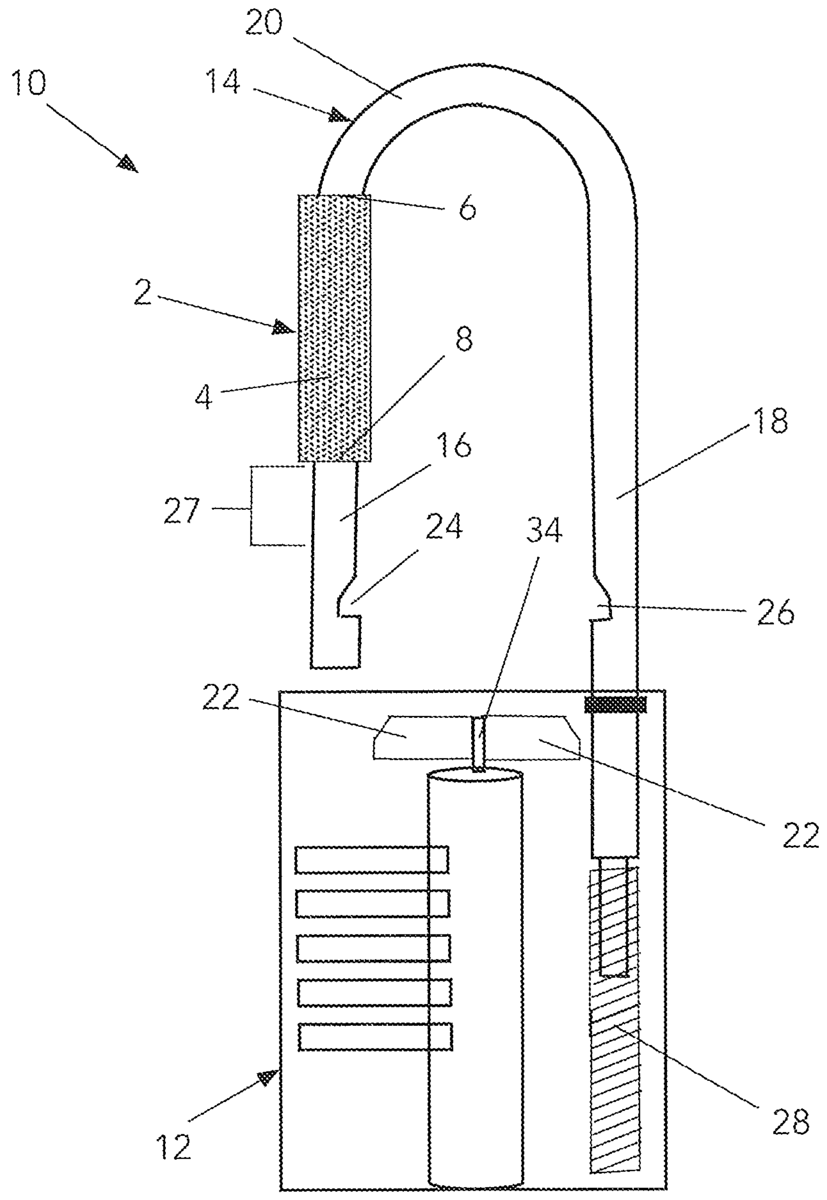
FIG. 6 shows the same padlocks as FIG. 4 with the addition of the disclosed invention installed on each shackle-toe. The first version of the disclosed invention is shown.

FIG. 6 shows the same padlock 10 and disclosed invention sleeve 2 as FIG. 5*a* except the padlock 10 is in the unlocked position.

Figure 7:
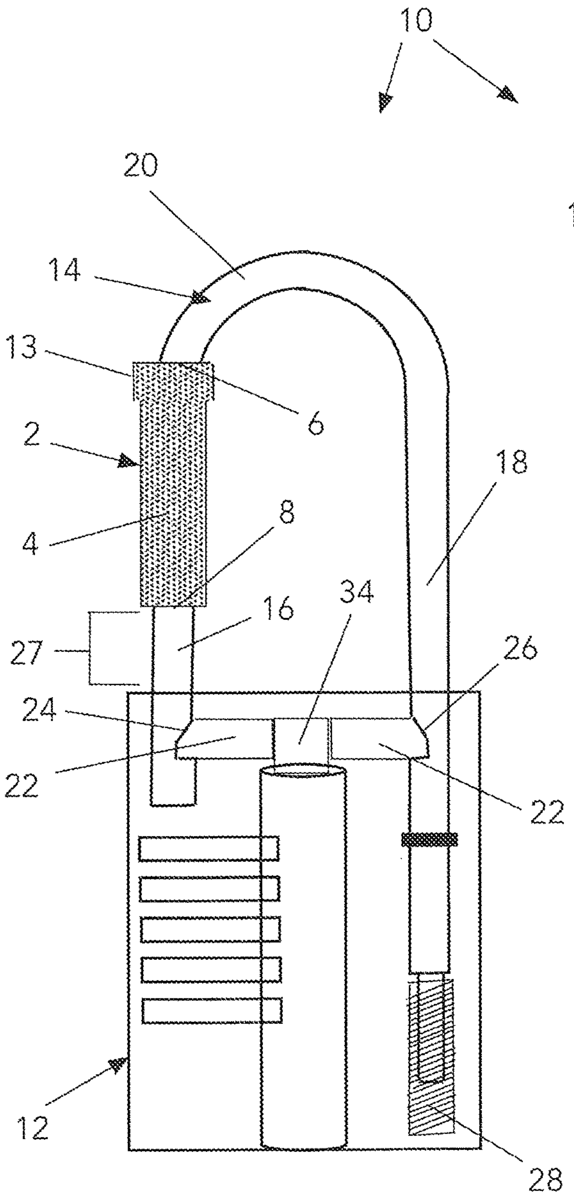
FIG. 7 and FIG. 8 shows the same padlocks as FIG. 3 and FIG. 4 with the addition of the disclosed invention installed on each shackle-toe. The second version of the disclosed invention is shown.
Figure 8:
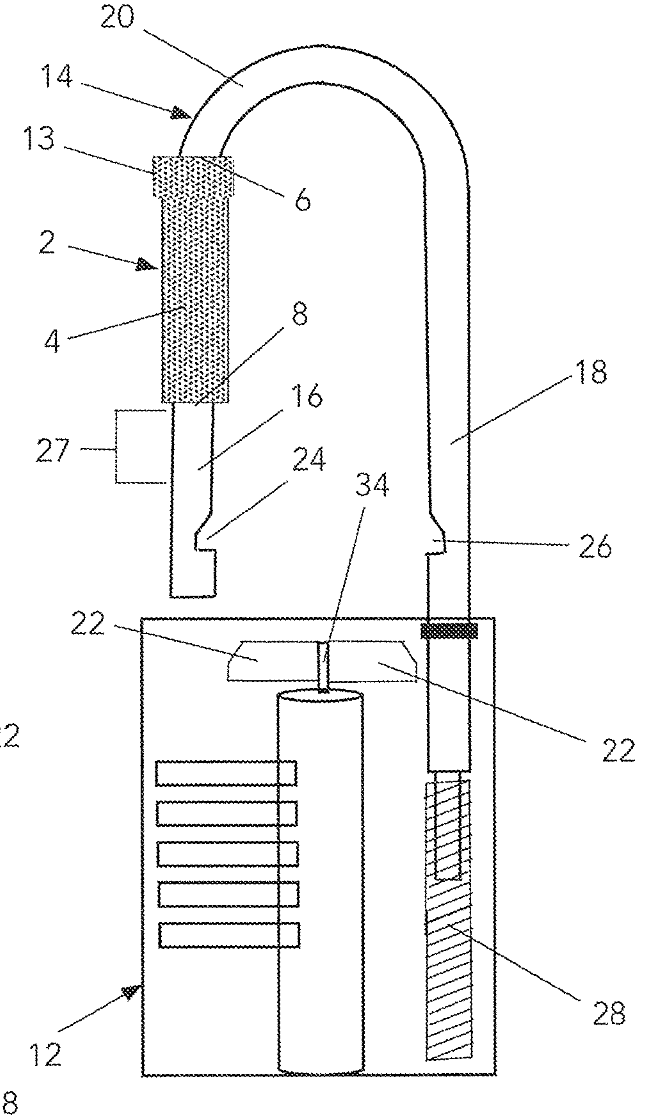

FIG. 7 and FIG. 8 shows the same padlocks 10 of FIG. 5*a* and FIG. 6 except the disclosed invention sleeve 2 is shown as the second version of the sleeve 2. The sleeve 2 on both FIG. 7 and FIG. 8 comprises the enlarged inside diameter (ID) 11 of the sleeve-first-end 6 when compared to the sleeve-trunk inside diameter (ID) 3 and also comprises the enlarged outside diameter (OD) 13 of the sleeve-first-end 6. The sleeve-second-end 8 outside diameter (OD) 5 is the same diameter as the sleeve-trunk 4.

Figure 9:
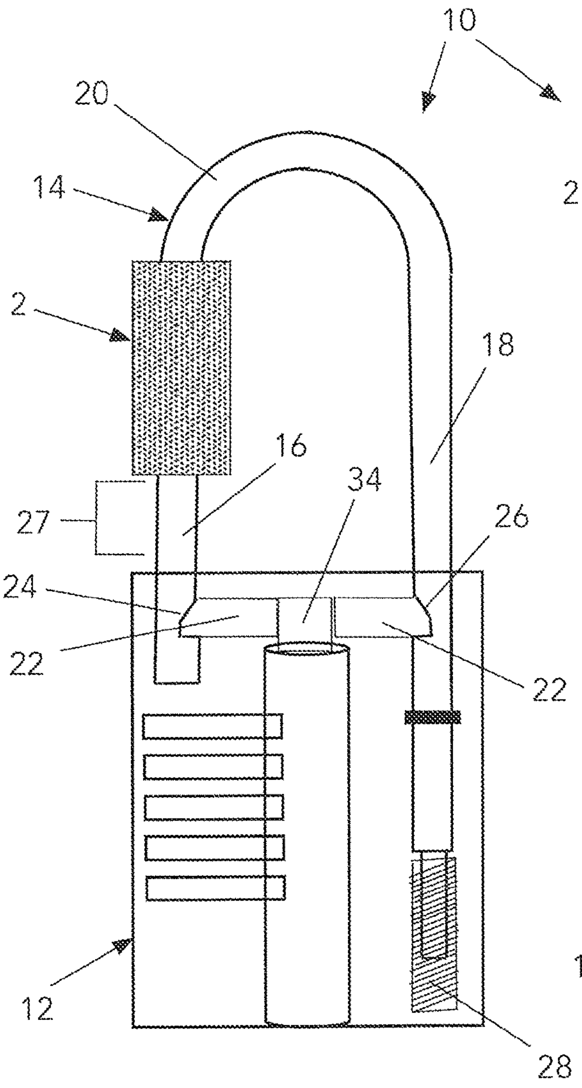
FIG. 9 and FIG. 10 shows the same padlocks as FIG. 3 and FIG. 4 with the addition of the disclosed invention installed on each shackle-toe. The third version of the disclosed invention is shown.
Figure 10:
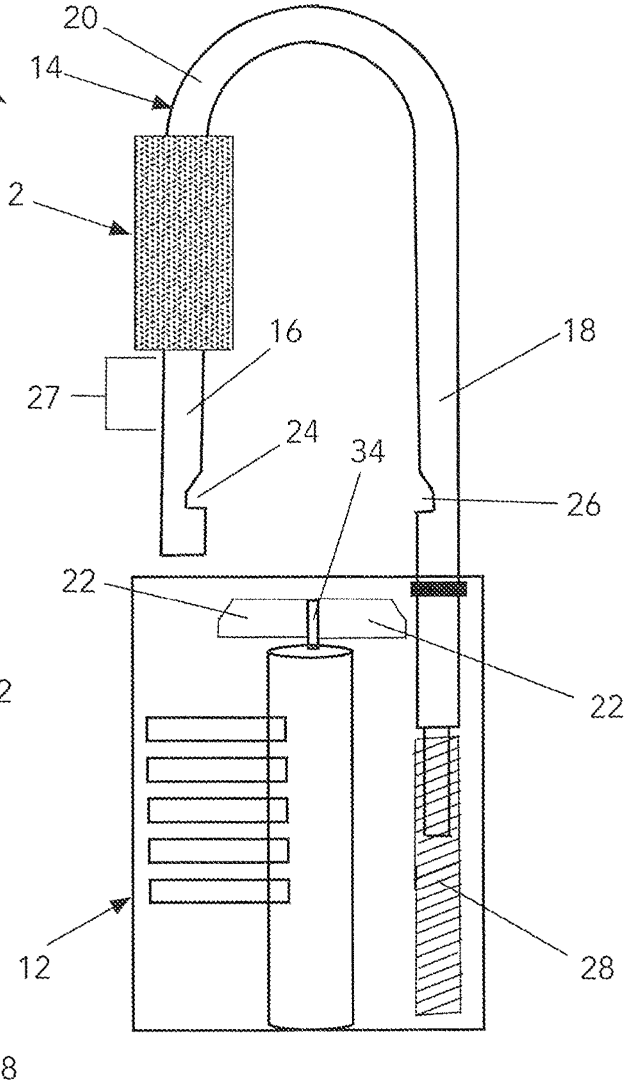

FIG. 9 and FIG. 10 shows the same padlocks 10 of FIG. 5*a* and FIG. 6 except the disclosed invention sleeve 2 is shown as the third version of the sleeve 2. The sleeve 2 on both FIG. 9 and FIG. 10 comprises the non-enlarged inside diameter (ID) 11 of the sleeve-first-end 6 when compared to the sleeve-trunk inside diameter (ID) 23, the sleeve-first-end 6 inside diameter (ID) is the same diameter as the sleeve-trunk inside diameter (ID) 23, and comprises an extra thick wall of the sleeve along the entire length of the sleeve. The sleeve-first-end 6 outside diameter (OD) 5 is the same diameter as the sleeve-trunk 4 outside diameter (OD) 25 and the sleeve-second-end 8 outside diameter (OD) 5 is the same diameter as the sleeve-trunk 4 outside diameter (OD) 25. The sleeve large outside diameter (OD) 5 of the third version of the sleeve 2 is the strongest version and the sleeve large outside diameter (OD) 5 of the sleeve 2 deters the shackle-toe 16 from being cut apart to enable the removal of the sleeve from the shackle-toe 16, therefore only enabling a jawed manual bolt cutter tool (see FIG. 18*a*) from cutting the shackle apart at the Shackle-head 20 or the shackle-heel 18.

Figure 11:
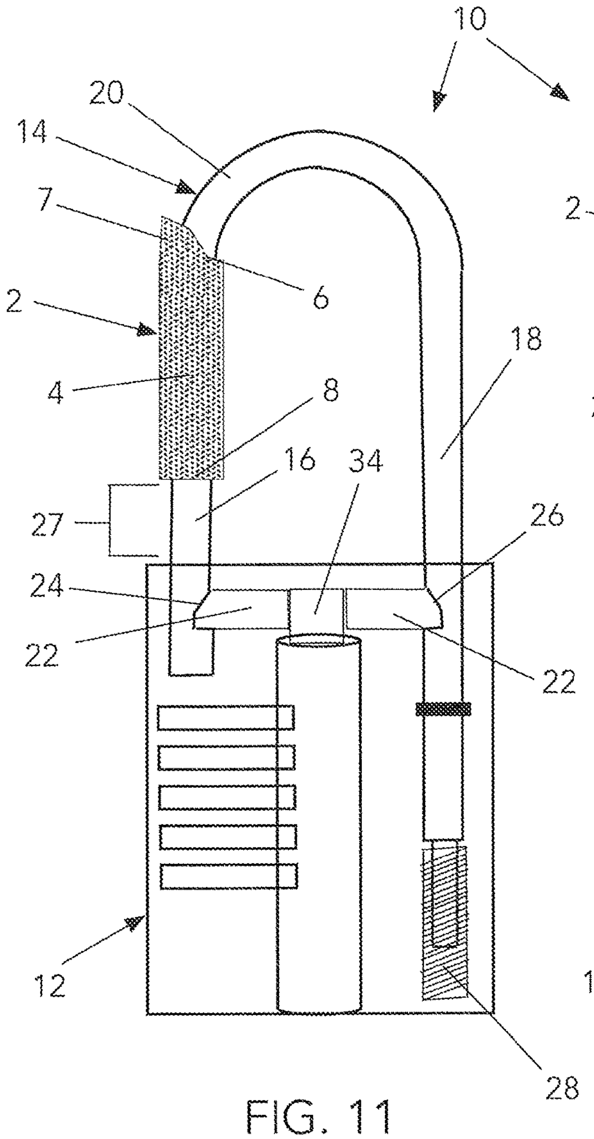
FIG. 11 and FIG. 12 shows the same padlocks as FIG. 3 and FIG. 4 with the addition of the disclosed invention installed on each shackle-toe. The fourth version of the disclosed invention is shown.
Figure 12:
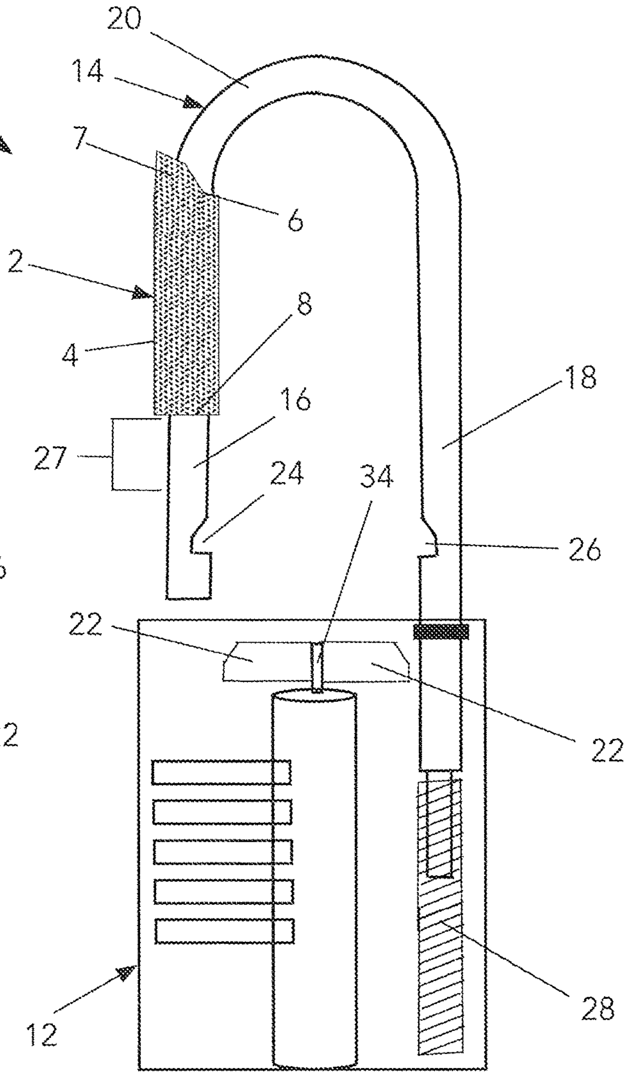

FIG. 11 and FIG. 12 shows the same padlocks 10 of FIG. 5*a* and FIG. 6 except the disclosed invention sleeve 2 is shown as the fourth version of the sleeve 2. The sleeve 2 on both FIG. 11 and FIG. 12 does not comprise the enlarged inside diameter (ID) 11 of the sleeve-first-end 6 when compared to the sleeve-trunk inside diameter (ID) 23 and does not comprise the enlarged outside diameter (OD) 13 of the sleeve-first-end 6 when compared to the sleeve-trunk 4. The sleeve-first-end 6 outside diameter (OD) 5 is the same diameter as the sleeve-trunk 4 and the sleeve-second-end 8 outside diameter (OD) is the same diameter as the sleeve-trunk outside diameter (OD) 25. The sleeve-first-end 6 comprises a cutout of the sleeve creating a sleeve-appendage 7 on the sleeve-first-end 6 at the opposite side of the cutout of the sleeve 2. The sleeve-appendage 7 covers three sides of the U-shaped-shackle 14 covering approximately fifty percent of the circumference of the U-shaped-shackle 14.

Figure 13:
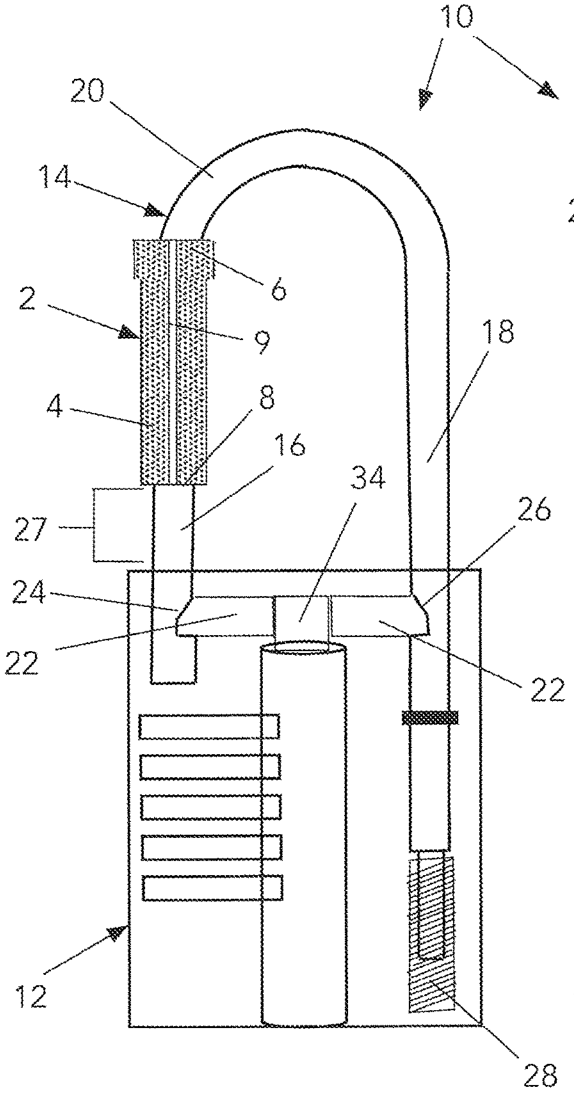
FIG. 13 and FIG. 14 shows the same padlocks as FIG. 7 and FIG. 8 with a variation of the second version of the disclosed invention, the variation being a lineal open slice in the sleeve.
Figure 14:
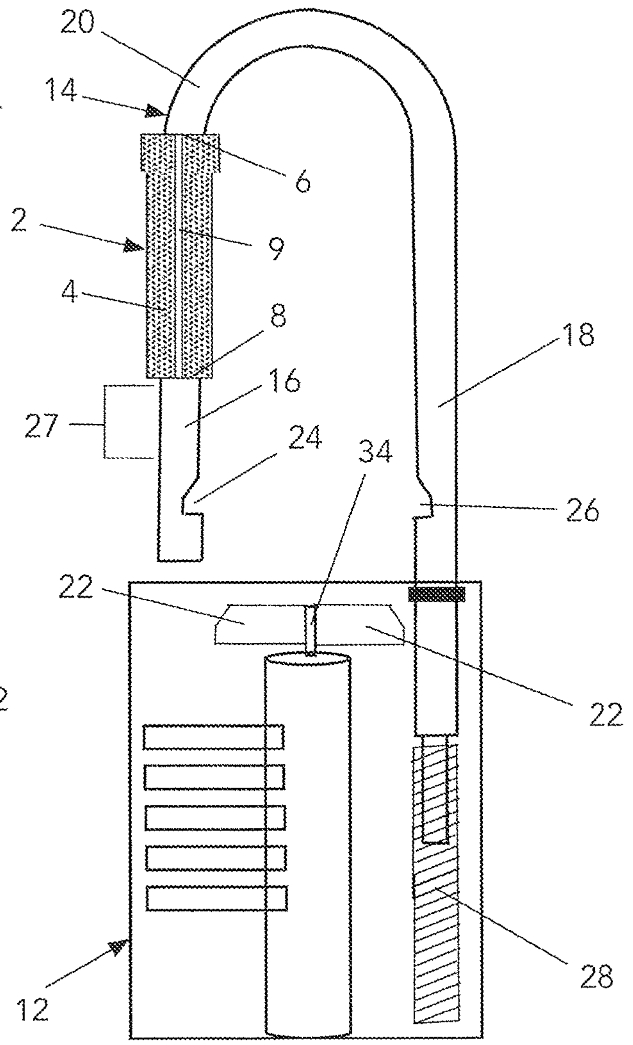

FIG. 13 and FIG. 14 shows the same padlocks as FIG. 7 and FIG. 8 with a variation of the second version of the sleeve 2, the variation of the sleeve 2 being a sleeve-lineal-open-slice 9 in the sleeve 2. The sleeve-lineal-open-slice 9 may allow a variable and flexible fit of the sleeve 2 on the Shackle 14, possibly resulting in a tighter fit of the sleeve 2 on the shackle 2 as opposed to the other versions of the sleeve. Any of the four versions of the sleeve 2 may comprise the sleeve-lineal-open-slice 9.

Figure 15:
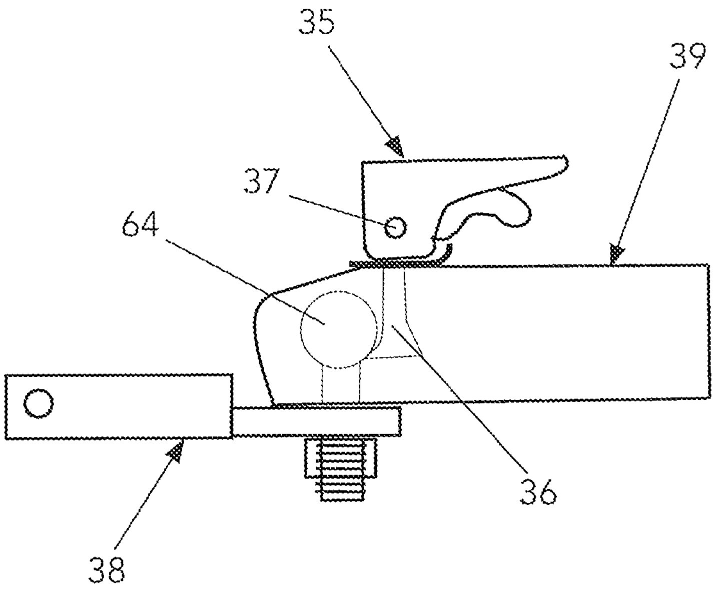
FIG. 15 Prior Art
FIG. 15 is a side view of a trailer tongue latching mechanism with a coupling attached, the coupling suitable to be installed in a tow vehicle receiver.

FIG. 15 shows a side view of i) a trailer tongue latching mechanism 35, ii) a trailer coupler 38, and iii) a trailer tongue 39. The trailer tongue latch 36 is shown holding onto the trailer coupler ball 64 by pressure from the trailer tongue latching mechanism 35 that is in the closed position and downward position. The trailer tongue latch hole 37 is shown without a padlock installed in the hole.

Figure 16:
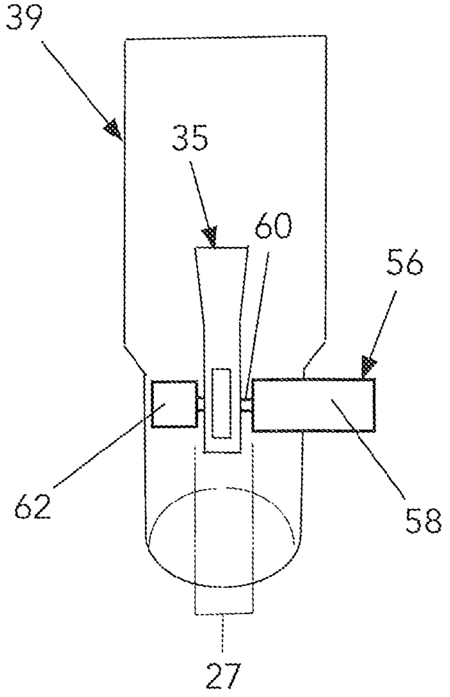
FIG. 16 Prior Art
FIG. 16 is a top view showing a trailer tongue latching mechanism with a pin and barrel lock locking the latching mechanism of the trailer tongue latching mechanism, the lock shackle is fitted though the trailer tongue latch hole. (see FIG. 15)

FIG. 16 shows a top view of i) a trailer tongue latching mechanism 35, ii) a trailer tongue 39, and a iii) a pin and barrel lock 56. The barrel 58 and the pin shackle 60 of the pin and barrel lock 56 are shown. This combination of the trailer tongue 39, trailer tongue latching mechanism 35, and pin and barrel lock 56 is common in the industry, the lock shackle is fitted though the trailer tongue latch hole. (see FIG. 15)

Figure 17A:
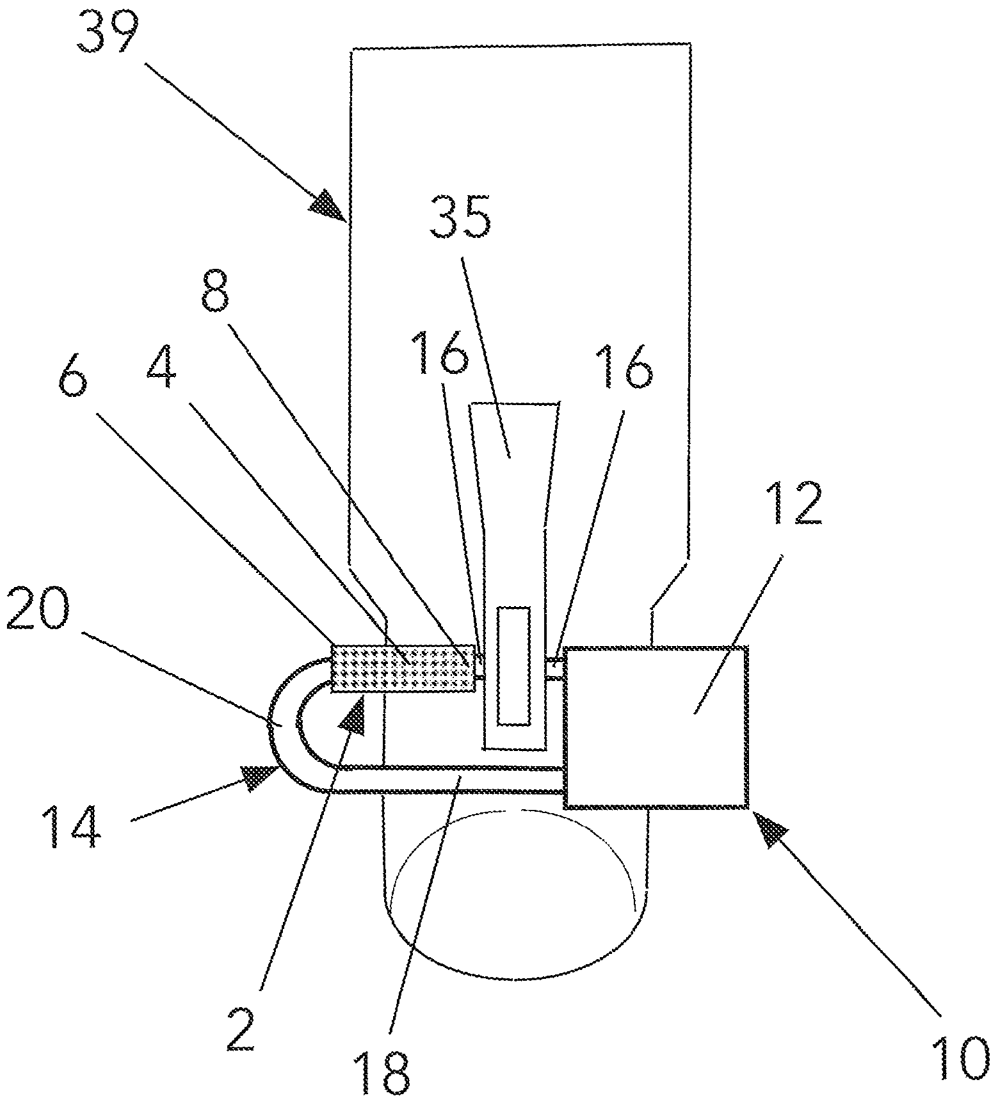
FIG. 17*a* is a top view of a trailer tongue latching mechanism with a padlock comprising the disclosed invention, the padlock is shown locking the latching mechanism of the trailer tongue latching mechanism, the lock is fitted though the trailer tongue latch hole. (see FIG. 15)

FIG. 17*a* shows a top view of i) a trailer tongue latching mechanism 35, ii) a trailer tongue 39, a iii) padlock 10 with a U-shaped shackle 14 in the locked position, and iv) the disclosed invention sleeve 2 attached to the padlock 10 shackle 14. The sleeve 2 is shown attached to the shackle-toe 16 with the sleeve-second-end 8 very close to the trailer tongue latching mechanism 35 preventing the jaws 44 of a jawed manual bolt cutter tool 42 from inserting between the sleeve-second-end 8 and the trailer tongue latching mechanism 35, this area referred to as the first shackle-toe cut area 17 (see FIG. 17*c*), therefore preventing the jawed bolt cutter tool 42 from cutting apart the shackle-toe 16 of the padlock 10 in that location. The attached position of the sleeve 2 on the shackle-toe 16 also creates a limited space between the trailer tongue latching mechanism 35 and the padlock 10 body, 12 this area referred to as the second shackle-toe cut area 19 (see FIG. 17*c*). The area of the shackle referred to as the first shackle-toe cut area 17 (see FIG. 17*c*) and the second shackle-toe cut area 19 (see FIG. 17*c*) is a portion of the shackle-toe-insert-area 27 (shown in FIGS. 5-14). When a padlock 10 with a properly sized disclosed invention sleeve 2 is attached to the shackle-toe 16 of the padlock 10, and the padlock 10 shackle-toe 16 is installed in a trailer tongue latching mechanism 35, the limited amount of space on each side of the trailer tongue latching mechanism 35 limits the exposure of shackle-toe 16 length available, therefore preventing a jawed manual bolt cutter tool 42 from inserting its jaws around the shackle-toe 16 to cut the shackle-toe 16 apart in those areas. In this scenario, the jaws 44 of a jawed manual bolt cutter tool 42 is prevented from being inserted between the trailer tongue latching mechanism 35 and the padlock body 12 and prevented from being inserted between the trailer tongue latching mechanism 35 and the sleeve-second-end 8 to cut apart the shackle-toe 16, therefore preventing a jawed manual bolt cutter tool 42 from removing the padlock 10 from the trailer tongue latching mechanism 35, therefore maintaining the security of the locked trailer tongue latching mechanism 35. In the event the jawed manual bolt cutter tool 42 is used to cut the padlock 10 shackle 14 apart at the shackle-heel 18 or at the shackle-head 20, the sleeve 2 will maintain its secured attached position on the shackle-toe 16 as the bend of the shackle-head 20 will not allow the sleeve 2 to be removed from the shackle-toe 16, the lock shackle is fitted though the trailer tongue latch hole. (see FIG. 15)

Figure 17B:
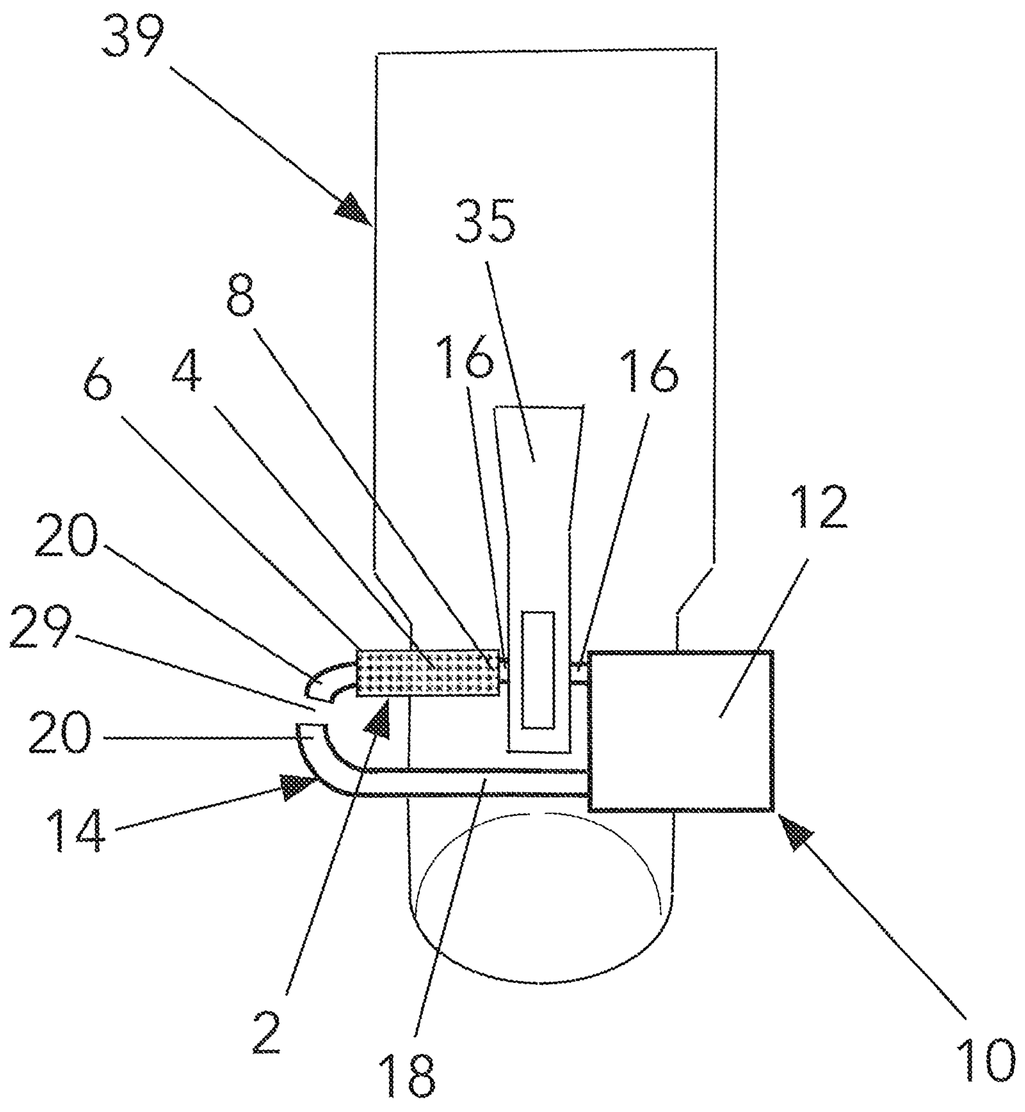
FIG. 17*b* is the same drawing as FIG. 17*a* with the exception of the added shackle-sever cut.

FIG. 17*b* shows the same drawing as FIG. 17*a* with the exception of the added shackle sever cut 29. The remaining shackle head 20 closest to the sleeve 2 comprises a portion of the U-shape of the shackle-head 20, therefore, preventing the tight fitting sleeve 2 from being removed from the shackle-toe 16, therefore, maintaining the locked position of the trailer tongue latching mechanism 35.

Figure 17C:
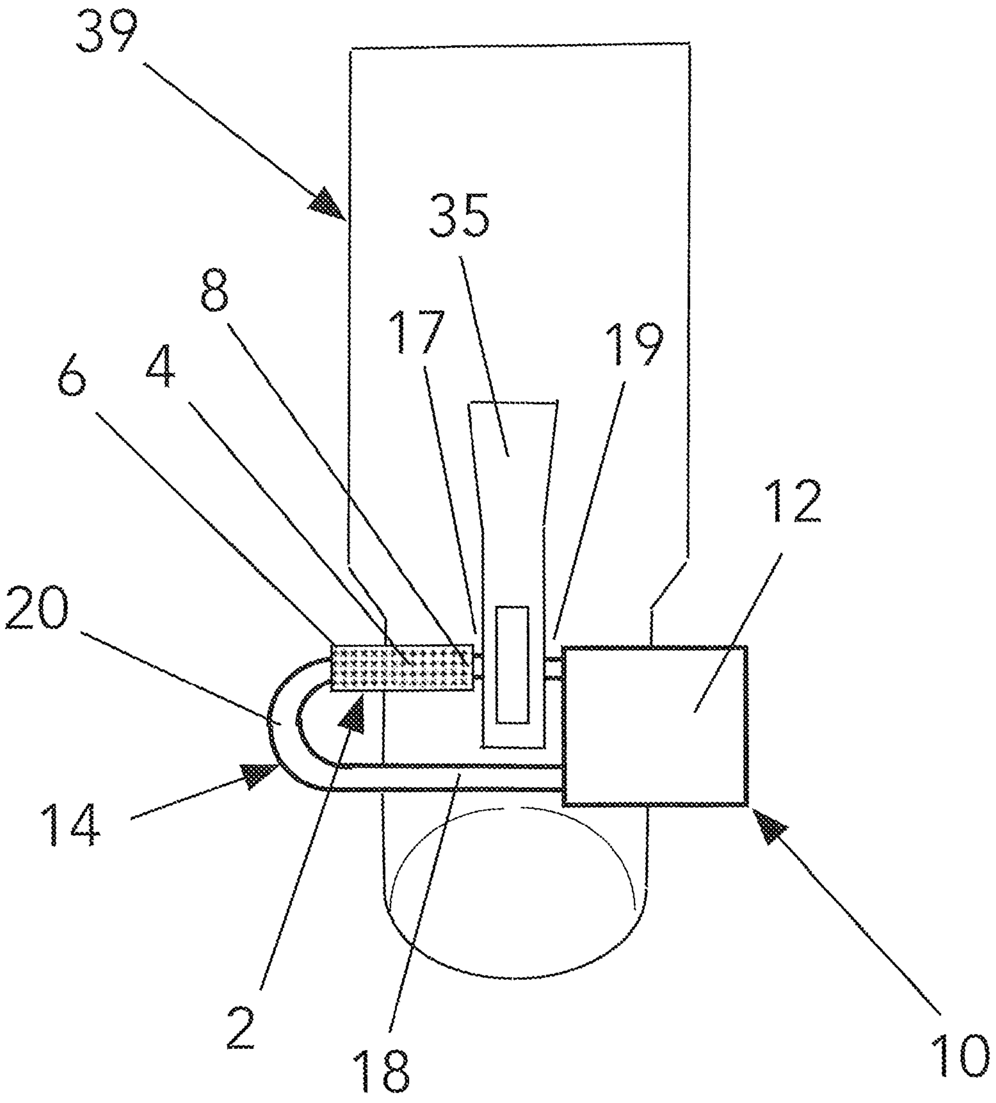
FIG. 17*c* is the same drawing as FIG. 17*a* with the exception of showing the first and second shackle-toe cut areas.

FIG. 17*c* shows the same drawing as FIG. 17*a* with the exception of identifying the first shackle-toe cut area 17 and the second shackle-toe cut area 19. If the shackle-toe 16 was cut apart at the first shackle-toe cut area 17 or the second shackle-toe cut area 19, the lock shackle 14 would be able to be removed from the locked trailer tongue latching mechanism 35.

Figures 18A, 18B:
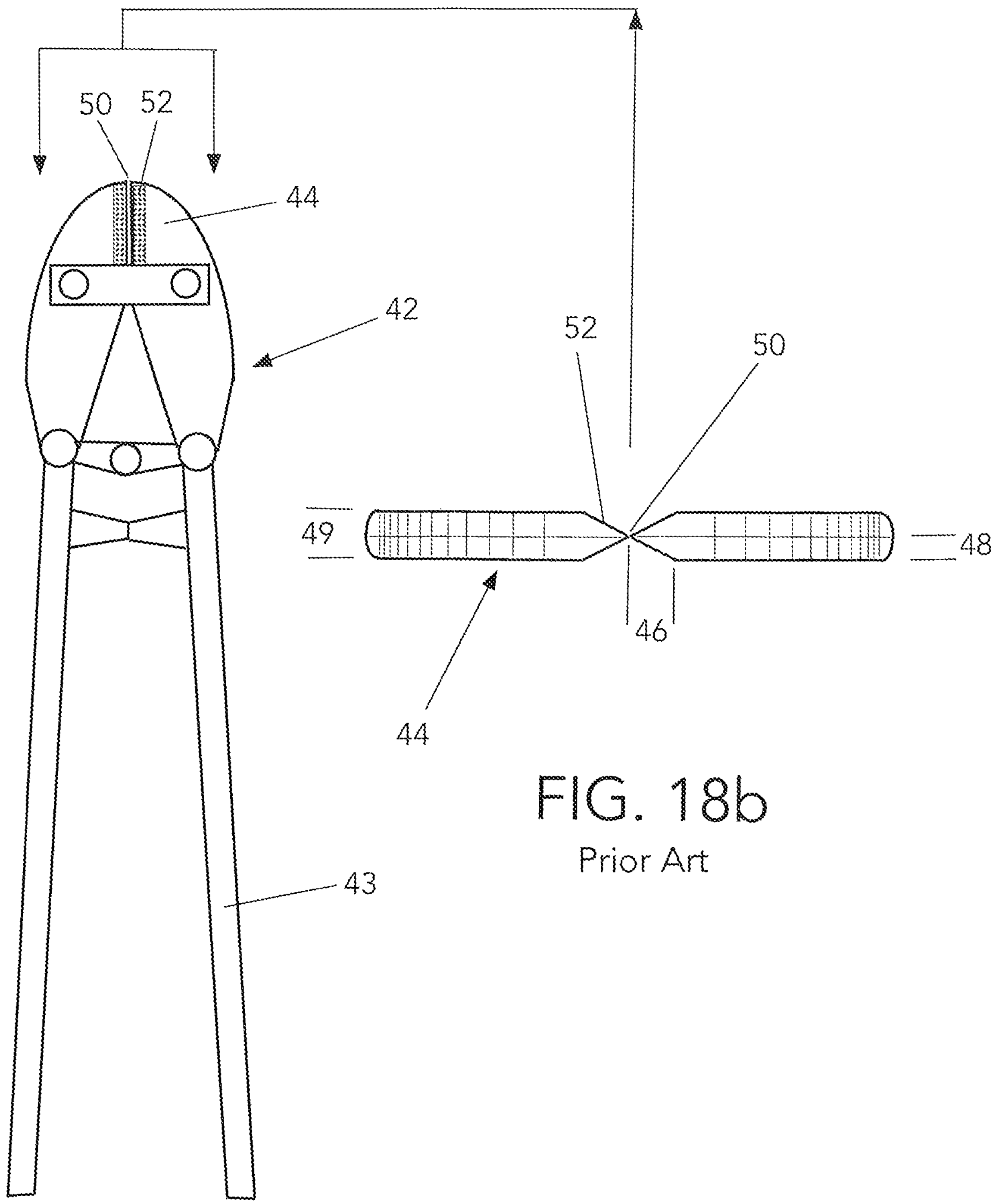
FIG. 18b Prior Art
FIG. 18a Prior Art
FIG. 18*a* is a side view of a jawed manual bolt cutter tool.
FIG. 18*b* is a close up top view of a jawed manual bolt cutter tool jaws.

FIG. 18*a* is a side view of a jawed manual bolt cutter tool 42. Shown is the bolt cuter tool handle 43 and bolt cutter tool jaws 44. The bolt cutter cutting edge 50 is shown next to the jaw taper 52.

FIG. 18*b* is a close up top view of a jawed manual bolt cutter tool jaws 44. The jaw taper length 46 is shown as well as the jaw cutting edge 50 and the jaw taper 52. In addition, the jaw outside edge to cutting edge 48 is shown as half of the dimension of the jaw thickness 49.

Figure 19:
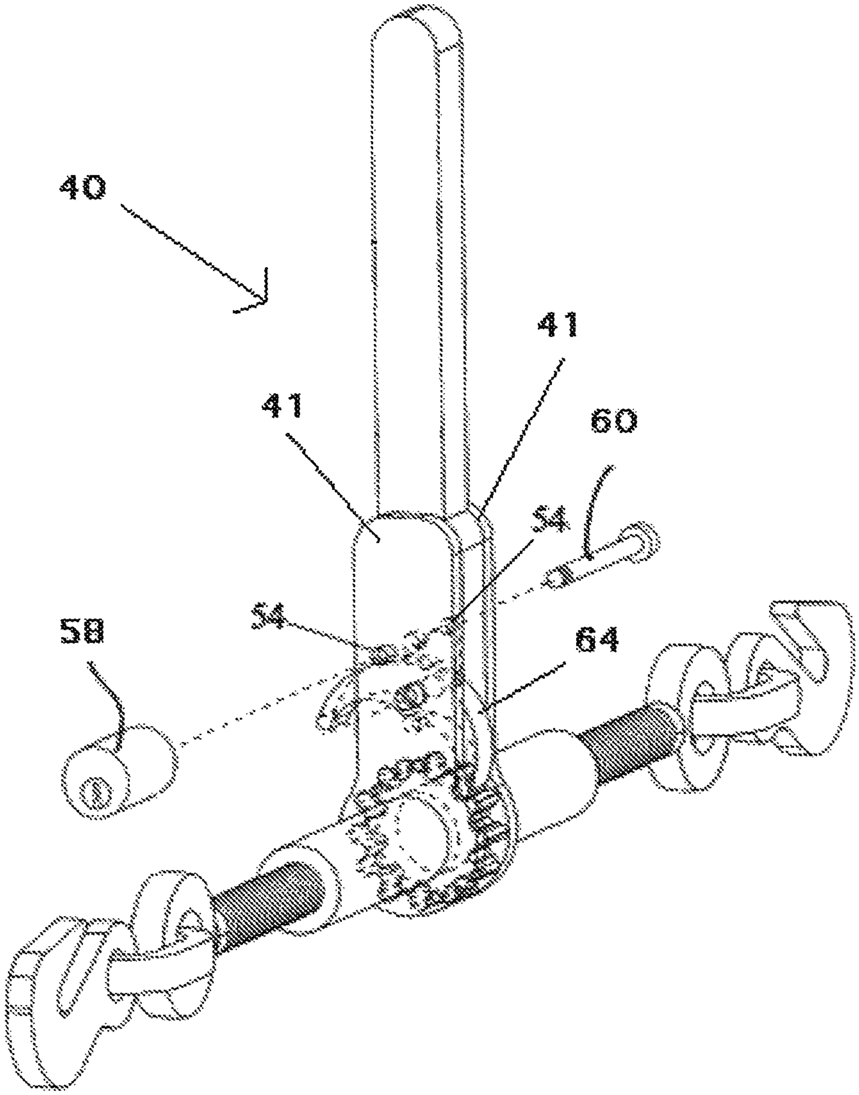
FIG. 19 Prior Art
FIG. 19 is a perspective view of a ratchet binder with a prior art pin and barrel lock installed in the handle assembly.

FIG. 19 is a perspective view of a ratchet binder 40 with a prior art pin and barrel lock 58+60 installed in the handle assembly 41+41. Two holes in the handle assembly 41 are the staple or link to be secured 54. The pawl 66 of the ratchet binder 40 is shown positioned between the handle assembly sides 41+41.

Figure 20:
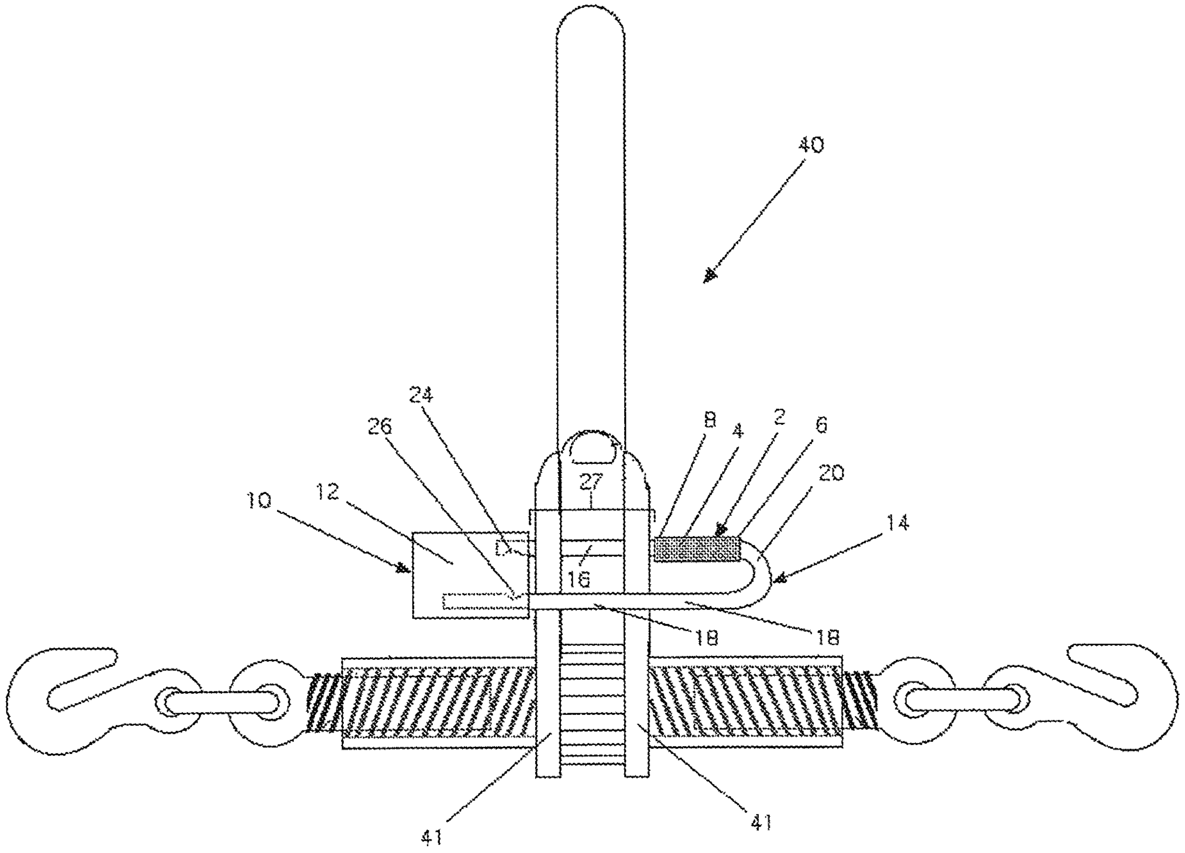
FIG. 20 is a side view of a ratchet binder comprising a padlock with the disclosed invention sleeve attached to the shackle and the shackle locked into the handle assembly of the ratchet binder.

FIG. 20 is a side view of a ratchet binder 40 comprising a padlock 10 with the disclosed invention sleeve 2 attached to the shackle 14 and the shackle 14 locked into the handle assembly 41+41 of the ratchet binder 40. Shown is the padlock 10 with the U-shaped-shackle 14. The padlock 10 body 12 is positioned on one side of the ratchet binder 40 handle assembly 41+41 and the sleeve 2 is positioned on the other side of the handle assembly 41+41. The staple or link secured 54 (see FIG. 19) by the padlock 10 are two holes in the ratchet binder 40 handle assembly 41+41 similar to the trailer tongue latch hole 37 (see FIG. 15) as both are a staple or link to be secured 54 (see FIG. 19). The ratchet binder 40 comprises one hole 54 (see FIG. 19) in each side of the handle assembly 41+41 equaling two holes for the shackle-toe 16 to insert into, (see FIG. 19). The shackle-toe-notch 24 and the shackle-heel-notch 26 are shown inside the padlock 10 body 12. The shackle-toe-insert-area 27 is shown leaving only a minimal length of the shackle-toe 16 between the padlock 10 body 12 and the ratchet binder 40 handle assembly 41, this area being the second shackle-toe cut area 19 (see FIG. 21), and a similar minimal length of the shackle-toe 16 is left between the sleeve-second-end 8 and the ratchet binder 40 handle assembly 41, this area being the first shackle-toe cut area 17 (see FIG. 21), resulting in too small of an area to fit the jaws 44 of a jawed manual bolt cutter tool 42 around the shackle-toe to cut the shackle-toe apart. Therefore, the padlock remains locked and secure in the two holes 54+54 of the ratchet binder handle assembly 41+41. Using a properly fitting sleeve 2 attached to the shackle-toe of the shackle, the first shackle-toe cut area 17 (see FIG. 21) and the second shackle-toe cut area 19 (see FIG. 21) are not able to be cut by a jawed manual bolt cutter tool 42.

Figure 21:
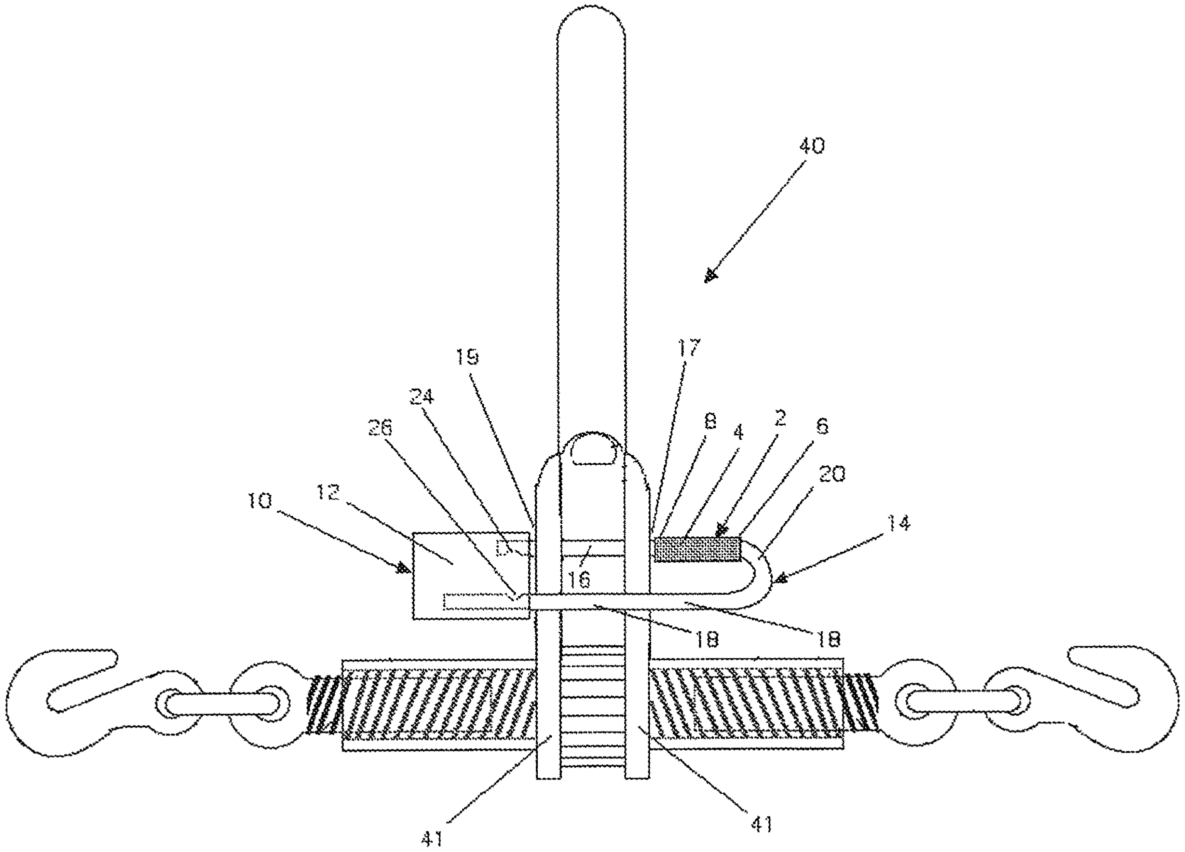
FIG. 21 is the same drawing as FIG. 20 with the exception of showing the first and second shackle-toe cut areas.

FIG. 21 shows the same drawing as FIG. 20 with the exception of identifying the first shackle-toe cut area 17 and the second shackle-toe cut area 19. If the shackle-toe 16 was cut apart at the first shackle-toe cut area 17 or the second shackle-toe cut area 19, the lock shackle 14 would be able to be removed from the ratchet binder 40 handle assembly 41+41.

Figure 22:
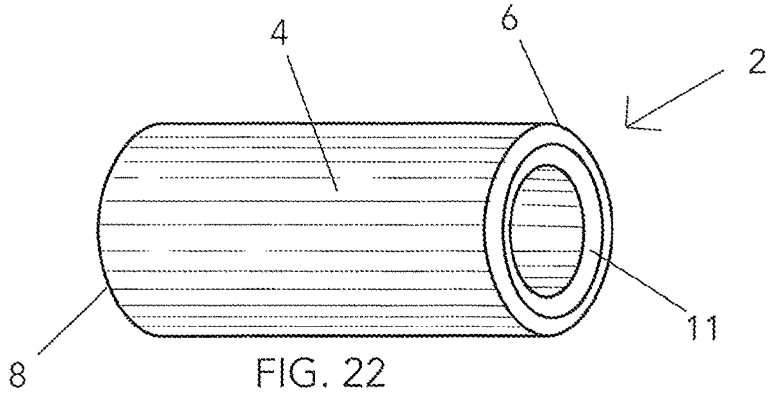
FIG. 22 is a perspective view of the sleeve showing the enlarged inside diameter.

FIG. 22 is a perspective view of the sleeve 2 showing the enlarged inside diameter 11, the sleeve first-end 6, the truck 4 and the sleeve second-end 8. The enlarged inside diameter 11 of the sleeve is formed by removing material from the sleeve.

Figure 23:
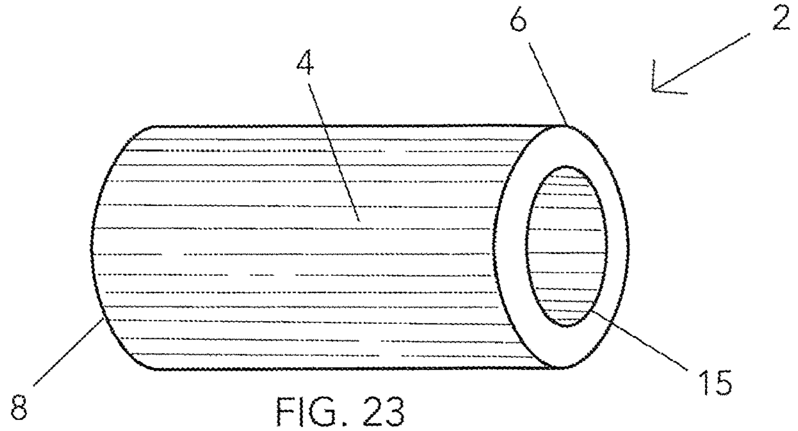
FIG. 23 is a perspective view of the sleeve showing the non-enlarged inside diameter of the sleeve first-end being the same inside diameter as the sleeve trunk.

FIG. 23 is a perspective view of the sleeve 2 showing the non-enlarged inside diameter 15 of the sleeve first-end 6 being the same inside diameter as the sleeve trunk 4. FIG. 23 being the third version of the invention.

Figure 24:
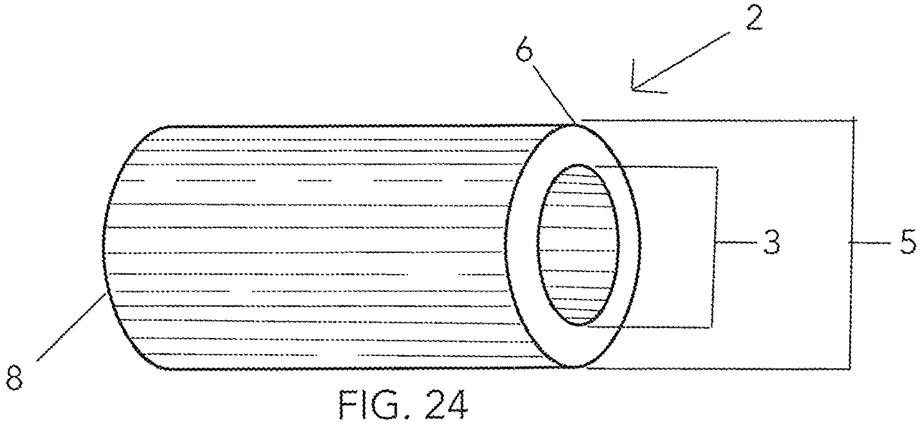
FIG. 24 is a perspective view of the sleeve identifying the inside ad the outside diameters of the sleeve.

FIG. 24 is a perspective view of the sleeve 2 identifying the sleeve inside diameter 3 ad the sleeve outside diameter 5. FIG. 24 being the third version of the invention.

Figure 25:
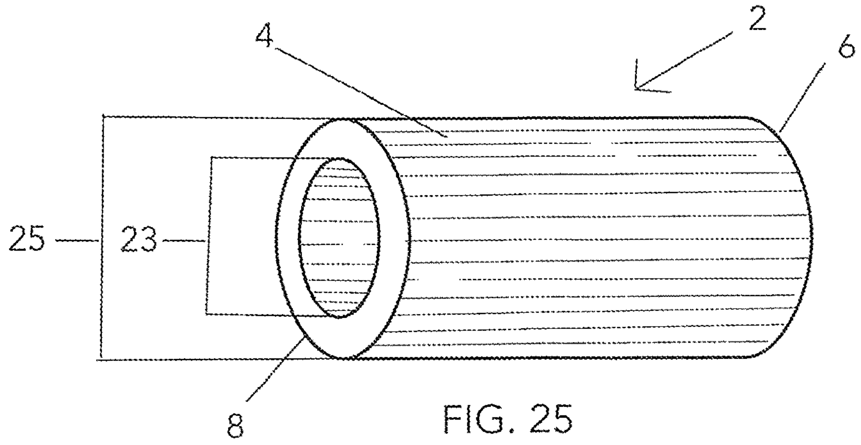
FIG. 25 is a perspective of the sleeve second-end showing the inside and the outside diameters of the sleeve second-end.

FIG. 25 is a perspective of the sleeve 2 second-end 8 showing the sleeve inside diameter 3 ad the sleeve outside diameter 5 of the second-end 8. The sleeve 2 second-end 8 inside diameter 3 being the same diameter as the trunk inside diameter 23.

Figure 26:
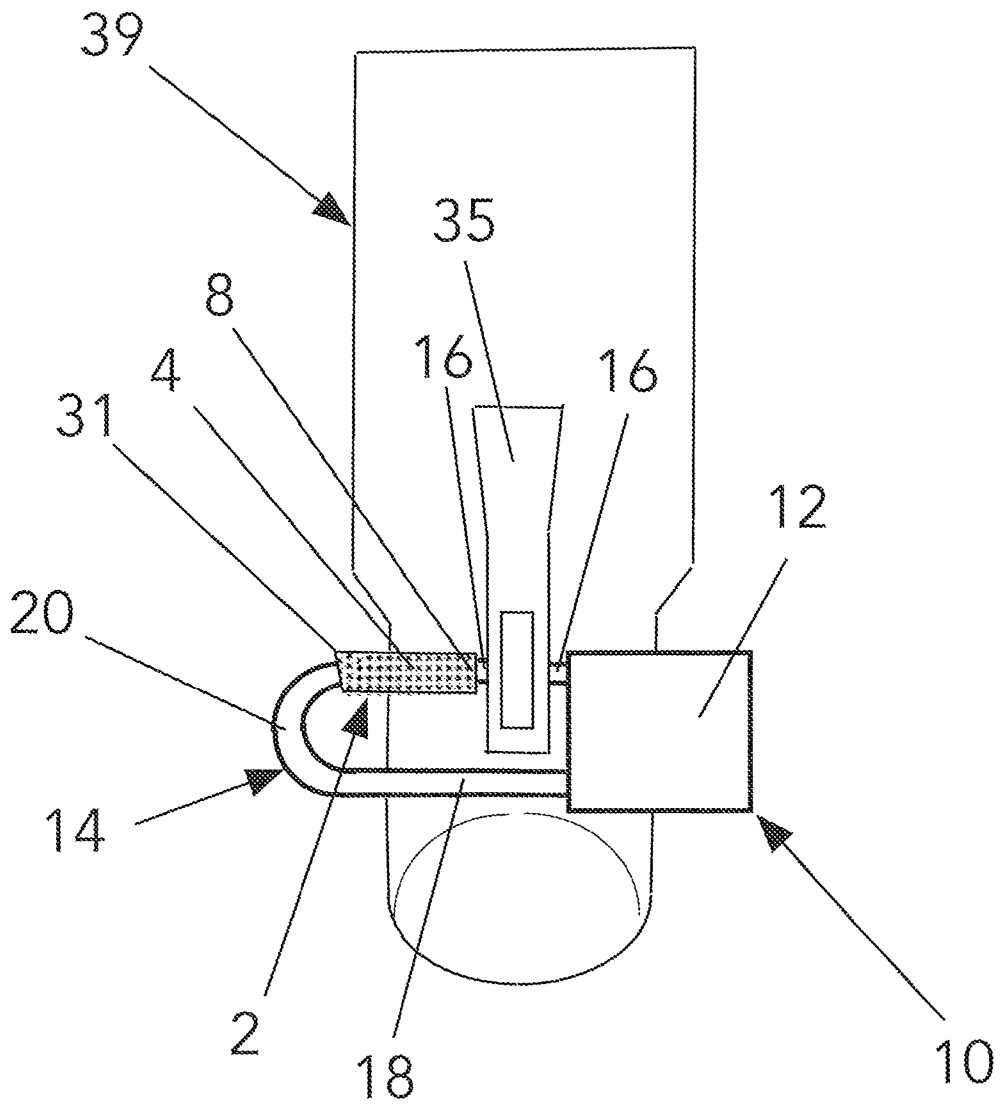
FIG. 26 is a top view of a trailer tongue latching mechanism with a padlock comprising the disclosed invention. The drawing is the same drawing as FIG. 17*a* except the sleeve first-end is shaped at a different angle than the sleeve in FIG. 17*a*.

FIG. 26 is a top view of a trailer tongue latching mechanism with a padlock comprising the disclosed invention. The drawing is the same drawing as FIG. 17*a* except the sleeve first-end is shaped at a different angle than the sleeve in FIG. 17*a*. The sleeve first-end-angle 31 is shown. The sleeve first-end-angle 31 may allow a larger coverage area of the sleeve over the shackle-head.

In the versions of the disclosed invention sleeve 2 wherein the inside diameter (ID) 3 of the sleeve-first-end 6 is enlarged when compared to the sleeve-trunk inside diameter (ID) 3, the sleeve-first-end 6 inside diameter (ID) 3 may be enlarged at a minimum of approximately ⅛ of an inch in length to a length of approximately ¼ inch or more, or i) the sleeve-first-end 6 inside diameter (ID) 3 may be enlarged at a minimum of approximately ⅛ of an inch in length to a length of approximately ¼ inch or more, and the sleeve-first-end 6 outside diameter (OD) 5 may also enlarged at or near the same length of the sleeve-first-end 6 inside diameter (ID) 3. A i) sleeve first end flared enlarged inside diameter (ID) 11, or a ii) sleeve first end flared enlarged inside diameter (ID) 11 and a sleeve first end flared enlarged outside diameter (ID) 13 may provide the same length of U-shaped-shackle-head 20 coverage (see FIG. 5*b*) with a shorter length of sleeve-first-end 6 enlargement area when compared to a linear uniform enlargement of the sleeve-first-end 6 inside and outside diameters. The sleeve-first-end 6 acts as a deterrent to the padlock U-shaped-shackle 14 being cut apart at the portion of the shackle-toe 16 that the sleeve mostly covers or surrounds (see FIG. 17*b*), and in addition, the sleeve 2 is designed to act as a deterrent to the padlock shackle 14 being cut apart at the location of the shackle 14 between the sleeve-second-end 8 and a locked object when the sleeve 2 is properly sized and installed on the shackle 14 size chosen for the padlock 10 and its intended purpose, (see FIG. 17*b*, FIG. 17*c* and FIG. 21) the sleeve 2 comprising sufficient strength to deter a jawed manual bolt cutting tool 42 from cutting apart the portions of the shackle 14 covered by the sleeve 2.

The non-enlarged length of the sleeve 2 is the sleeve-trunk 4 that fits tightly around the shackle-toe 16 and is usually approximately at least ¼ inch in length and typically approximately at least ½ of an inch to 1 inch in length depending on the shackle-toe 16 length of the padlock 10. The sleeve-trunk 4 may be much longer than 1 inch as the sleeve 2 is required to be positioned approximately no more than ⅛ of an inch from a device such as a trailer tongue latching mechanism 35 when the padlock 10 is in a locked position with the shackle-toe 16 inserted in the trailer tongue latching mechanism 35 latch hole 37 and when the sleeve-first-end 6 is butted against the U-shaped-shackle-head 20 (see FIG. 17*a*). The entire trunk inside diameter (ID) 23 maintains a shape that allows the tightly fitting portion of the sleeve 2 to slide completely on the straight portion of the shackle-toe 16 while the sleeve-first-end 6 abuts against the U-shaped-shackle-head 20, and while any, if any loosely fitting portion of the sleeve inside diameter (ID) 3 of the sleeve-first-end 6 slides partially over the U-shaped-shackle-head 20 creating the shackle-head-coverage 21 (see FIG. 5*b*). An enlarged inside diameter (ID) 11 of the sleeve-first-end 6 when compared to the sleeve-trunk inside diameter (ID) 23 is typically tightly butted against the U-shaped-shackle-head 20, (see FIG. 5) allowing the enlarged inside diameter (ID) 11 of the sleeve-first-end 6 when compared to the sleeve-trunk inside diameter (ID) 23 to cover a portion of the U-shaped-shackle-head 20 creating the shackle-head-coverage 21.

FIG. 5*b* comprises and displays the U-shaped shackle-head-coverage 21. FIGS. 5*a*, 6, 7, 8, 9, 10, 13, and 14 all comprise the U-shaped shackle-head-coverage 21 FIG. 5*b* displays.

At least a portion of the sleeve outside diameter (OD) 5 is required to be large enough to be prevented from being pulled through the hole, staple, or link 54 that the shackle-toe 16 is fitted and secured into (see FIGS. 15 and 16). It may be preferable that the sleeve outside diameter (OD) 5 is large enough to be prevented from being pulled through the hole, staple, or link 54 that the shackle-toe 16 is fitted and secured into, but it is also viable and acceptable that only an enlarged outside diameter (OD) 5 small portion of the sleeve 2 is large enough to be prevented from being pulled through the hole, staple, or link 54 that the shackle-toe 16 is fitted and secured into. Preventing any portion of the sleeve 2 from being pulled through the hole, staple, or link 54 that the shackle-toe 16 is fitted and secured into will maintain the security of the locked object. At least one portion of the outside diameter (OD) of the sleeve being sized sufficiently large enough to prevent the sleeve from passing through a hole, staple, or link 54 that the shackle-toe 16 fits into wherein the shackle-toe 16 maintains typical space between the shackle 14 outside diameter (OD) and the hole, staple, or link 54 inside diameter (ID), the typical space allowing for necessary but minimal shackle 14 movement within the hole, staple, or link 54.

It is also viable and acceptable to have the sleeve-second-end 8 fitted with an enlarged outside diameter (OD) 5 to further assist in preventing the jaws 44 of a jawed manual bolt-cutter tool 42 access between the sleeve-second-end 8 and the device such as a trailer tongue latching mechanism 35 that is being secured by the padlock 10. The inside diameter (ID) 3 of the sleeve-second-end 8 nearest to the device such as a trailer tongue latching mechanism 35 preferably will remain non-enlarged when compared to the trunk inside diameter (ID) 23.

When the sleeve 2 is installed on a padlock 10 shackle 14, the sleeve 2 protects a portion of the shackle 14 that is covered by the sleeve 2 from damage, and when the shackle 14 is installed in a hole, staple, link, 54 or other object such as a trailer tongue latching mechanism 35 (see FIG. 17*a*), the sleeve 2 must prevent at least one portion of the sleeve 2 from being pulled through the hole, staple, or link 54 that the shackle-toe 16 is fitted and secured into, therefore maintaining the security of the object such as a trailer tongue latching mechanism 35 that the padlock 10 is locked into. In the case of a sleeve 2 being enlarged only at the sleeve-first-end 6 and the enlarged inside diameter (ID)11 of the sleeve 2 when compared to the sleeve-trunk inside diameter (ID) 23 and not to the outside diameter (OD) 5 of the sleeve 2, the outside diameter (OD) 5 of any portion of the sleeve 2 must be large enough to be prevented from being pulled through the hole, staple, or link 54 that the shackle-toe 16 is fitted and secured into.

When the padlock 10 is in the locked position, and the shackle is cut apart at the U-shaped-shackle-head 20 as close as possible to the sleeve-first-end 6, the remaining portion of the U-shaped-shackle-head 20 prevents the sleeve 2 from being removed from the combination of the Shackle-toe 16 and the small portion of the U-shaped-shackle-head 20 that was not removed from the cut of the shackle 14. The curved portion of the shackle-head 20 (see FIG. 17*b*) that is still attached to the shackle-toe 16 will not allow the sleeve inside diameter (ID) 3 to be removed from the shackle-toe 16, therefore maintaining the locked position of the padlock 10 in the hole, staple or link 54.

The purpose of the sleeve 2 that mostly covers or surrounds a portion of the shackle-toe 16 is to create armor around a portion of the shackle-toe 16 and to create armor around a small portion of the U-shaped-shackle-head 20 creating the shackle-head-coverage 21 to prevent a jawed manual bolt cutter tool 42 from cutting the padlock 10 shackle 14 directly adjacent to the sleeve-first-end 6. The sleeve 2 will tightly mostly cover or tightly surround the straight portion of the shackle-toe 16 and loosely mostly cover or loosely surround a portion of the U-shaped-shackle-head 20 nearest the shackle-toe 16 (see FIG. 5*b*), to prevent a jawed manual bolt cutter tool 42 from cutting the padlock 10 shackle 14 directly adjacent to the sleeve-first-end 6. The sleeve 2 may be flared or enlarged at the sleeve-first-end 6 that mostly covers a portion of, or surrounds a portion of the U-shaped-shackle-head 20, the flare or enlargement will create a enlarged inside diameter (ID) 11 of the sleeve-first-end 6 when compared to the sleeve-trunk 4. The enlarged inside diameter (ID) 11 inside of the flair or enlargement of the sleeve-first-end 6 will allow the sleeve-first-end 6 to cover a small portion of the U-shaped-shackle-head 20.

In the fourth version cutout configuration (see FIGS. 11 and 12) of the disclosed invention, the sleeve 2 comprises a cutout in the sleeve-first-end 6, the cutout in the sleeve 2 is placed on the inside portion of the U-shaped-shackle-head 20 during the installation of the sleeve 2 on the padlock 10 shackle 14. The cutout removes a portion of the circumference of the sleeve-first-end 6, the cutout being approximately ¼ inch in length. The cutout being placed on the inside portion of the U-shaped-shackle-head 20 allows the portion of the sleeve-first-end 6 with the appendage 7 to be placed on the outside portion of the U-shaped-shackle-head 20, and allows the sleeve 2 to slide upon and to cover a portion of the U-shaped-shackle-head 20, preventing or deterring the shackle 14 from being cut apart at the straight portion of the shackle-toe 16 nearest the U-shaped-shackle-head 20. Although, in this installation of using a sleeve 2 with an cutout and no enlarged outside diameter (OD) 13 of at least one end of the sleeve 2, the sleeve-trunk 4 is required to have an outside diameter (OD) 5 greater than the hole, staple, or link 54 that the shackle-toe 16 is fitted and secured into to maintain a secured lock of the object being locked. In addition, in this version of the disclosed invention sleeve 2 wherein there is no enlarged outside diameter (OD) 13 of the sleeve 2 and an aperture is cutout of the end of the sleeve 2, there can also be an enlarged inside diameter (ID) 11 of the sleeve-first-end 6 when compared to the sleeve-trunk inside diameter (ID) 23, the enlarged inside diameter (ID) 11 of the sleeve-first-end 6 allowing additional coverage of the U-shaped-shackle-head 20 by the sleeve 2 portion on the opposite side of the cutout of the sleeve-first-end 6.

The material of the sleeve 2 may be steel and preferably hardened steel, or any other material that is resistant to the cutting apart of, or penetration of the jaws 44 of a device such as a jawed manual bolt cutter tool 42. When the sleeve 2 is constructed of steel, the manufacture of the sleeve 2 when forming the enlargement of the sleeve-first-end 6 inside diameter (ID) 3 or when cutting the cutout in the sleeve-first-end 6 is performed, both functions are normally performed when the steel is in a malleable state. The creation of the cutout is performed by removing a portion of the sleeve 2 and creating an opening or open space.

In the scenario of a U-shaped-shackle-head 20 padlock comprising the sleeve 2 is installed and locked on an object such as a trailer tongue latching mechanism 35, and if a jawed manual bolt-cutter tool 42 is not able to cut through the sleeve 2, and if there is not sufficient space between the sleeve-second-end 8 and the trailer tongue latching mechanism 35 to allow the jaws 44 of the manual bolt-cutter tool 42 access to cut the shackle-toe 16 at that location, the shackle-toe 16 will not be cut apart. In this scenario, the sleeve 2 will only allow the jawed manual bolt-cutter tool 42 to cut through the shackle 14 at a portion of the U-shaped-shackle-head 20 (see FIG. 17*b*) or cut through the shackle 14 at a portion at the shackle-heel 18 (see FIG. 17*b*). Cutting the shackle-head 20 apart or cutting the shackle-heel 18 apart and the sleeve 2 being installed on the shackle-toe 16, the locked shackle-toe 16 will not be released from the locked object such as a trailer tongue latching mechanism 35, the sleeve 2 will not allow the shackle-toe 16 to be removed from the trailer tongue latching mechanism 35, therefore, the trailer tongue latching mechanism 35 remains locked and secured. The portion of the shackle-toe 16 not covered or surrounded by the sleeve 2 being of sufficient length to allow passage through a hole, staple, or link 54 and then be secured in the body 12 of the padlock 10 while the length of the shackle-toe 16 passed through and remaining in the hole, staple, or link 54 is not covered or surrounded by the sleeve 2.

The utility of the disclosed invention is a properly sized sleeve 2 for the corresponding padlock 10 shackle 14 that can be installed upon or removed from most any sized U-shaped-shackle-head 20 padlock 10. The sleeve 2 length and diameter matching the padlock's 10 shackle 14 length and diameter being considered while also sizing the sleeve 2 length to match the object to be locked, the spread of the object to be locked consuming a portion of the shackle-toe 16 being considered. This foregoing consideration allows the user of the padlock 10 to choose the sleeve 2 diameters and length for most any installation using a U-shaped-shackle-head 20 padlock 10 to lock an object or mechanism. The same padlock 10 can be at different occasions installed with different sized sleeve 2 lengths for different objects to be locked.

The disclosed invention allows the use of a very versatile and inexpensive U-shaped-shackle-head 20 padlock 10 that can be used for many different purposes to be equipped with shackle 14 armor of a sleeve 2 for a distinct and particular purpose, and then if the sleeve 2 is not permanently attached with a process such as welding or other process such as pressing the sleeve on with substantial force, the end user may also remove the sleeve 2 from the padlock 10 shackle 14 to allow other uses of the padlock 10 or change the size of the sleeve 2 on the shackle 14 easily and inexpensively to use for other alternative secure uses of another sleeve 2 on the same padlock 10. In addition, the sleeve 2 increases the strength of the shackle-toe 16 area covered by the sleeve 2 in effect, granting a ¼ of an inch diameter shackle-toe 16 the cutting resistance strength of a ½ of an inch diameter shackle-toe 16, therefore also possibly saving the end user of the padlock 10 the expense of upgrading the shackle 14 diameter of the ¼ of an inch diameter shackle-toe 16 to the ½ of an inch diameter shackle-toe 16, and also allowing the ¼ of an inch diameter shackle-toe 16 to fit in a tighter area than the ½ of an inch diameter shackle-toe 16.

The foregoing detailed description is given primarily for clearness of understanding and no unnecessary limitations are to be understood therefrom, for modification will become obvious to those skilled in the art upon reading this disclosure and may be made without departing from the spirit of the invention and scope of the appended claims. Accordingly, this invention is not intended to be limited by the specific exemplifications presented herein, rather, what is intended to be covered is within the spirit and scope of the appended claims.

I claim:

1. A padlock with a body and a U-Shaped shackle, the shackle diameter being consistent throughout the entire length of the shackle, the shackle comprising, i) a straight shackle heel, ii) a U-Shaped shackle head, iii) a straight shackle toe, the padlock also comprising ::

a) a slide-on sleeve attached to the shackle toe, the sleeve comprising; i) a sleeve-first-end, ii) a sleeve-second-end, and iii) a sleeve-trunk, the sleeve mostly covering or surrounding a portion of the shackle-toe nearest the U-Shaped shackle-head, b) the sleeve-trunk fits tightly around the shackle-toe;

c) the sleeve-first-end partially covering or surrounding a small portion of the U-shaped-shackle-head nearest the shackle-toe, the sleeve-second-end being the portion of the sleeve closes to the padlock body, and the sleeve-trunk being the area of the sleeve between the sleeve-first-end and the sleeve-second-end;

d) the sleeve second end positioned to provide a shackle-toe-insert-area of the shackle-toe not covered or surrounded by the sleeve, the shackle-toe-insert-area being of sufficient length to allow the shackle-toe-insert-area passage through and remaining in an external device providing a hole, staple, or link with the shackle toe locked in the body of the padlock, e) the sleeve comprising sufficient strength to deter a jawed manual bolt cutting tool from cutting apart the portions of the shackle covered by the sleeve;

f) at least one portion of the outside diameter (OD) of the sleeve being sized sufficiently large enough to prevent the sleeve from passing through the hole, staple, or link of the external device that the shackle-toe-insert-area fits into wherein the shackle-toe maintains typical space between the shackle outside diameter (OD) and the hole, staple, or link inside diameter (ID), the typical space allowing for necessary but minimal shackle movement within the hole, staple, or link;

the sleeve inhibits or prevents the jawed manual bolt cutter tool from cutting apart the shackle-toe near the sleeve first-end; and with the padlock installed in a locked position on the external device such as a latching mechanism, and the length of the sleeve sized properly, the sleeve inhibits or prevents the jawed manual bolt cutter tool from cutting apart the shackle-toe between the sleeve second-end and the latching mechanism, and the sleeve inhibits or prevents the jawed manual bolt cutter tool from cutting apart the shackle-toe between the latching mechanism and the padlock body.

2. The padlock of claim 1 wherein the sleeve comprises an enlargement of the inside diameter (ID) of the sleeve-first-end when compared to the sleeve-trunk inside diameter (ID) without enlarging the outside diameter (OD) of the sleeve-first-end.

3. The padlock of claim 2 wherein the sleeve-first-end inside diameter enlargement is a linear enlargement.

4. The padlock of claim 2 wherein the sleeve-first-end inside diameter enlargement is a flared enlargement.

5. The padlock of claim 1 wherein the sleeve comprises the enlargement of the inside diameter (ID) of the sleeve-first-end when compared to the sleeve-trunk inside diameter (ID) and wherein the sleeve comprises the enlargement of the outside diameter (OD) of the sleeve-first-end when compared to the trunk outside diameter (OD).

6. The padlock of claim 5 wherein the sleeve-first-end inside diameter enlargement is a linear enlargement.

7. The padlock of claim 5 wherein the sleeve-first-end inside diameter enlargement is a flared enlargement.

8. The padlock of claim 1 wherein the sleeve comprises a cutout of the sleeve-first-end, the cutout creating an appendage protruding from the sleeve-trunk, the appendage partially covering a portion of the U-shaped-shackle-head.

9. The padlock of claim 1 wherein the sleeve comprises a metal.

10. The padlock of claim 1 wherein the sleeve comprises metal alloys.

11. The padlock of claim 1 wherein the sleeve is permanently attached to the shackle.

12. The padlock of claim 1 wherein the sleeve is removably attached to the shackle-toe.

13. The padlock of claim 1 wherein the sleeve comprises a lineal open slice of the sleeve, the lineal open slice in the sleeve prevents the sleeve from surrounding the shackle toe.

14. A system comprising:

a. the padlock of claim 1; and b. the padlock shackle-toe passed through a hole, staple, or link of the external device.

15. A padlock with a body and a U-Shaped shackle, the shackle diameter being consistent throughout the entire length of the shackle, the shackle comprising, i) a straight shackle heel, ii) a U-Shaped shackle head, iii) a straight shackle toe, the padlock also comprising:

a) a slide-on sleeve attached to the shackle toe, the sleeve comprising; i) a sleeve-first-end, ii) a sleeve-second-end, and iii) a sleeve-trunk, the sleeve mostly covering or surrounding a portion of the shackle-toe nearest the U-Shaped shackle-head, b) the sleeve-trunk fits tightly around the shackle-toe;

c) the sleeve-first-end inside diameter (ID) being the same diameter as the sleeve-trunk inside diameter (ID), the sleeve first-end fits tightly around the shackle-toe, the sleeve first-end abutting the U-Shaped bend of the shackle-head, the sleeve-second-end being the portion of the sleeve closest to the padlock body, the sleeve-trunk is the area of the sleeve between the sleeve-first-end and the sleeve-second-end, the sleeve wall thickness being of sufficient thickness such as ¼ of an inch to ½" of an inch of wall thickness to prevent a jawed manual bolt cutter tool from positioning the cutting edges of the jaws on the straight shackle-toe near the sleeve first-end, therefore, inhibiting or preventing the jaws of the jawed manual bolt-cutter tool from cutting the shackle at the straight shackle-toe near the sleeve first-end, the jaws outside edge to jaws cutting edge preevents ;

d) the sleeve second end positioned to provide a shackle-toe-insert-area of the shackle-toe not covered or surrounded by the sleeve, the shackle-toe-insert-area being of sufficient length to allow the shackle-toe-insert-area passage through and remaining in an external device providing a hole, staple, or link with the shackle toe locked in the body of the padlock, e) the sleeve comprising sufficient strength to deter a jawed manual bolt cutting tool from cutting apart the portions of the shackle covered by the sleeve;

f) at least one portion of the outside diameter (OD) of the sleeve being sized sufficiently large enough to prevent the sleeve from passing through a hole, staple, or link that the shackle-toe fits into wherein the shackle-toe maintains typical space between the shackle outside diameter (OD) and the hole, staple, or link inside diameter (ID), the typical space allowing for necessary but minimal shackle movement within the hole, staple, or link, the sleeve inhibits or prevents the jawed manual bolt cutter tool from cutting apart the shackle-toe near the sleeve first-end; and with the padlock installed in a locked position on the external device such as a latching mechanism, and the length of the sleeve sized properly, the sleeve inhibits or prevents the jawed manual bolt cutter tool from cutting apart the shackle-toe between the sleeve second-end and the latching mechanism, and the sleeve inhibits or prevents the jawed manual bolt cutter tool from cutting apart the shackle-toe between the latching mechanism and the padlock body.

16. The padlock of claim 15 wherein the sleeve comprises a metal.

17. The padlock of claim 15 wherein the sleeve comprises metal alloys.

18. The padlock of claim 15 wherein the sleeve is permanently attached to the shackle-toe.

19. The padlock of claim 15 wherein the sleeve is removably attached to the shackle-toe.

20. The padlock of claim 15 wherein the sleeve comprises a lineal open slice of the sleeve, the lineal open slice in the sleeve prevents the sleeve from surrounding the shackle toe.

21. A system comprising:

a) the padlock of claim 15; and b) the padlock shackle-toe is passed through a hole, staple, or link of the external device.

* * * * *